United States Patent [19]
Heddle

[11] Patent Number: 5,946,652
[45] Date of Patent: Aug. 31, 1999

[54] METHODS FOR NON-LINEARLY QUANTIZING AND NON-LINEARLY DEQUANTIZING AN INFORMATION SIGNAL USING OFF-CENTER DECISION LEVELS

[76] Inventor: Robert Heddle, c/o Sony Corporation 7-35, Kitashinagawa 6-chome, Shinagawa-ku, Tokyo, Japan

[21] Appl. No.: 08/586,689
[22] PCT Filed: May 3, 1995
[86] PCT No.: PCT/US95/05505
  § 371 Date: Jun. 24, 1996
  § 102(e) Date: Jun. 24, 1996
[87] PCT Pub. No.: WO96/35269
  PCT Pub. Date: Nov. 7, 1996
[51] Int. Cl.$^6$ ................................................ H04B 14/04
[52] U.S. Cl. .................................... 704/230; 341/126
[58] Field of Search ........................... 704/229, 230; 341/126

[56] References Cited

U.S. PATENT DOCUMENTS

| | | | |
|---|---|---|---|
| 3,973,081 | 8/1976 | Hutchins | 704/230 |
| 4,202,018 | 5/1980 | Stockham, Jr. | 360/47 |
| 4,386,237 | 5/1983 | Virupaksha | 179/15.55 |
| 4,516,241 | 5/1985 | Farah et al. | 370/465 |
| 4,713,776 | 12/1987 | Araseki | 704/229 |
| 4,809,274 | 2/1989 | Walker et al. | 371/37.02 |
| 4,870,685 | 9/1989 | Kadokawa et al. | 704/212 |
| 5,134,475 | 7/1992 | Johnston et al. | 348/415 |
| 5,150,387 | 9/1992 | Yoshikawa et al. | 375/240 |
| 5,157,760 | 10/1992 | Akagiri | 704/233 |
| 5,166,686 | 11/1992 | Sugiyama | 341/155 |
| 5,166,981 | 11/1992 | Iwahashi et al. | 704/230 |
| 5,185,800 | 2/1993 | Mahieux | 704/500 |
| 5,197,087 | 3/1993 | Iwahashi et al. | 375/240 |
| 5,285,476 | 2/1994 | Akagiri et al. | 375/25 |
| 5,341,457 | 8/1994 | Hall, II et al. | 704/226 |

(List continued on next page.)

FOREIGN PATENT DOCUMENTS

| | | | |
|---|---|---|---|
| 0255111 A2 | 2/1988 | European Pat. Off. | G11B 20/10 |
| 0466190 A2 | 1/1992 | European Pat. Off. | G11B 20/10 |

OTHER PUBLICATIONS

Roger C. Wood, "On Optimum Quantization," IEEE Transactions on Information Theory, vol. IT–15, No. 2, pp. 248–252, Mar. 1969.

Joel Max, "Quantizing for Minimum Distortion," IRE Transactions on Information Theory, vol. IT–6, No. 1, pp. 7–12, Mar. 1960.

'A Unified Formulation of Segment Companding Laws and Synthesis of Codecs and Digital Compandors', H. Kaneko Bell System Technical Journal, vol. 49, No. 7, Sep. 1970 New York, U.S. pp. 1555–1588.

Digitally Linearizable Compandors with Comments on "Project for a Digital Telephone Network" Wm.T. Montgomery—IEEE Transactions on Communication Technology, vol. com18, No. 1, Feb. 1970 New York, U.S.

*Primary Examiner*—David R. Hudspeth
*Assistant Examiner*—Tálivaldis Ivars Šmits
*Attorney, Agent, or Firm*—Limbach & Limbach LLP

[57] ABSTRACT

Data representing an information signal are non-linearly quantized to generate respective quantized data that represent the information signal using fewer bits. Each of the data, when non-linearly quantized, is represented by a quantizing level selected from a number of quantizing levels. The data are non-linearly quantized according to a non-linear function, the decision levels being off-center between adjacent quantizing levels obtained thereby from the quantizing values. The data and word-length information indicating the number of quantizing levels are received. A quantizing value for each quantizing level in the number of quantizing levels is determined from the word-length information and the non-linear function. The quantizing values determined for all the quantizing levels in the number of quantizing levels are non-uniformly spaced. Finally, the quantizing level having the quantizing value closest in value to the data value of each of the data is selected as a respective one of the quantized data.

52 Claims, 12 Drawing Sheets

U.S. PATENT DOCUMENTS

| | | | |
|---|---|---|---|
| 5,375,189 | 12/1994 | Tsutsui | 704/229 |
| 5,521,713 | 5/1996 | Oikawa | 386/112 |
| 5,608,713 | 3/1997 | Akagiri et al. | 369/124 |
| 5,617,219 | 4/1997 | Oikawa | 386/111 |
| 5,623,577 | 4/1997 | Fielder | 704/229 |
| 5,632,003 | 5/1997 | Davidson et al. | 704/229 |
| 5,634,082 | 5/1997 | Shimoyoshi et al. | 704/229 |
| 5,642,383 | 6/1997 | Suzuki | 375/241 |

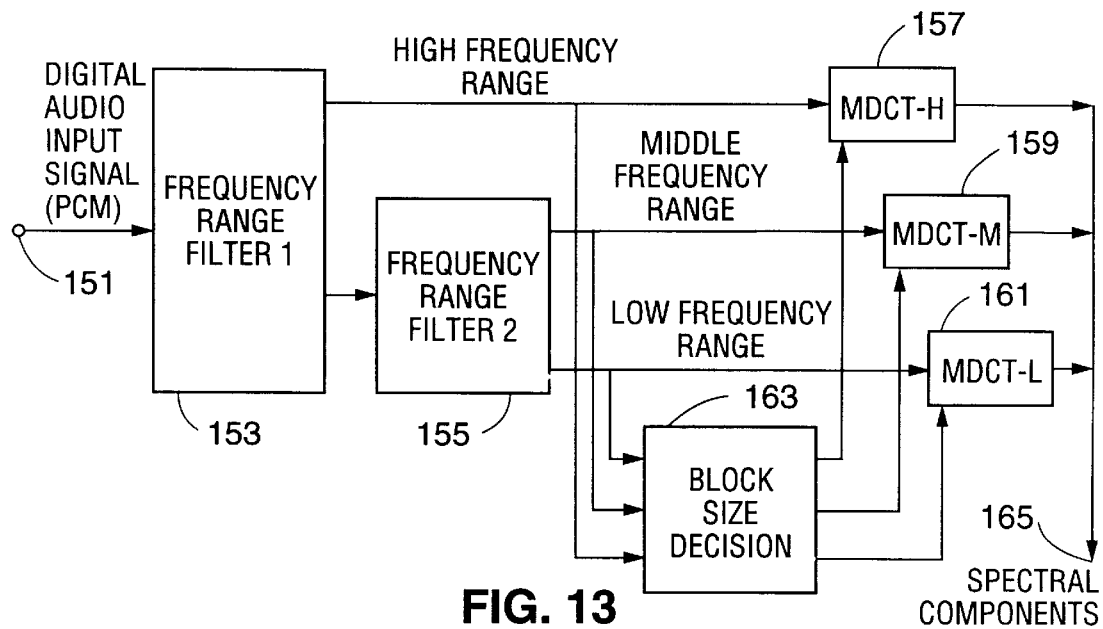
FIG. 13
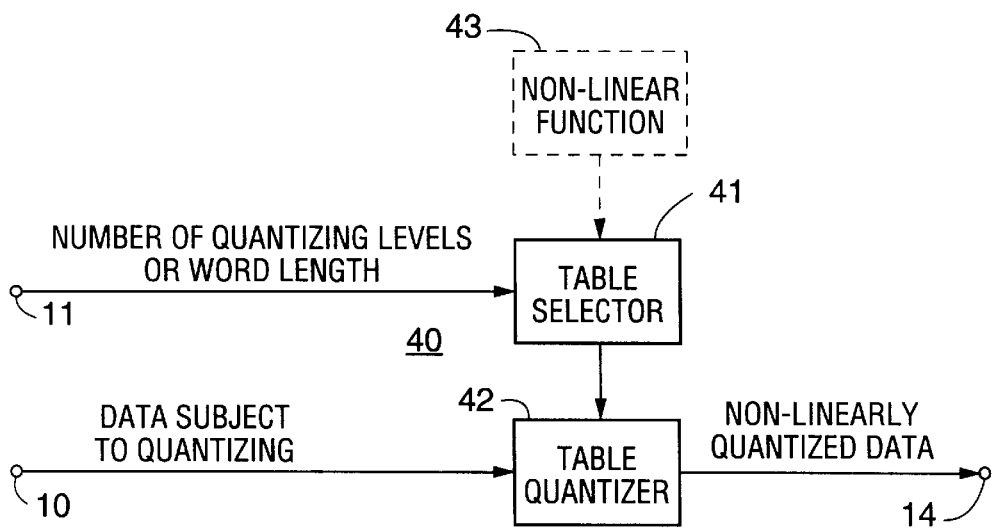
FIG. 14
| INPUT DATA RANGE | QUANTIZING LEVEL |
|---|---|
| ( 0.60, 1.00 ) | 2 |
| ( 0.20, 0.59 ) | 1 |
| (−0.20, 0.19 ) | 0 |
| (−0.60, −0.21 ) | −1 |
| (−1.00, −0.61 ) | −2 |
FIG. 15

METHODS FOR NON-LINEARLY QUANTIZING AND NON-LINEARLY DEQUANTIZING AN INFORMATION SIGNAL USING OFF-CENTER DECISION LEVELS

FIELD OF THE INVENTION

The invention relates to signal compression, in which an information signal is represented using a reduced number of bits, and to signal expansion in which the number of bits representing the information signal is restored.

BACKGROUND OF THE INVENTION

When a digital information signal is compressed for storage and/or transmission at a reduced bit rate, the samples of the information signal are often requantized using a reduced word length. Reducing the word length by which each of the samples is represented reduces the number of bits required to represent the information at the expense of an increase in quantizing errors. This requantizing is usually done linearly by uniformly distributing quantizing values corresponding to the available quantizing levels across the range of values of the information signal and requantizing each sample of the information signal to the closest quantizing value. The same technique may be used to requantize transform coefficients representing the information signal.

In some applications, such as the so-called ISO/MPEG layer three audio coding standard, the quantizing values corresponding to the available quantizing levels are distributed non-uniformly. Distributing the quantizing values non-uniformly allows certain values of the information signal to be quantized more accurately than other values. This provides better results than linear quantizing when, for example, the values that are quantized more accurately occur more frequently than the values that are quantized less accurately, or errors in the values that are quantized more accurately are more noticeable. Both of these possibilities may occur in low bit rate audio compression.

Many audio compression systems orthogonally transform the audio input signal into the frequency domain before quantizing. When this is done, small-amplitude spectral coefficients occur more frequently than large-amplitude spectral coefficients for most practical input signals. Additionally, because of the psychoacoustic phenomenon of simultaneous masking that occurs between the members of a group of contiguous spectral coefficients, noise due to quantizing errors is less likely to be heard in the presence of large-amplitude coefficients than in the presence of small-amplitude coefficients. For this reason, a non-linear quantizing scheme that concentrates more quantizing levels at small amplitudes can lead to a significant improvement in sound quality.

Non-linear quantizing is normally implemented by a applying linear quantizing to a non-linearized version of the data subject to quantizing. The data subject to quantizing are normally a block or set of data, such as a set of spectral coefficients, that are to be quantized using the same number of quantizing levels, or the same word length. In non-linear quantizing, the data subject to quantizing are pre-processed by a non-linear function, and the resulting pre-processed data are then quantized using uniformly-spaced quantizing values. Thus, if Q[x] represents a linear quantizing of x, and f(x) is a non-linear function of x, then non-linear quantizing can be represented as Q[f(x)]. This technique is specified by the ISO/MPEG layer three audio coding standard, for example.

FIG. 1 illustrates a known linear quantizing scheme Q[x] having five quantizing levels. FIG. 1 shows the relationship between the data value x of the data subject to quantizing and the resulting quantizing levels. The five possible quantizing levels denoted by the circled integers above the horizontal axis. Each quantizing level has a corresponding quantizing value. For example, in FIG. 1, the quantizing level 2 has a quantizing value of 1.0, and the quantizing level −1 has a quantizing value of −0.5. The data value x of the data subject to quantizing and the quantizing level of the quantizing values are indicated in FIG. 1 by the values −1.0, −0.5, 0, 0.5, and 1.0 below the horizontal axis.

In the linear quantizing scheme illustrated in FIG. 1, the data value x is quantized to the quantizing level having a quantizing value that is closest to x. In FIG. 1, the decision values between adjacent quantizing values are indicated by broken lines. For example, the broken line $D_{01}$ indicates the decision value between the quantizing values 0 and 0.5. Data values between adjacent decision values are all quantized to the same quantizing level, and hence to the same quantizing value.

The data values of the data subject to quantizing may be restricted to the range between −1.0 and 1.0. Alternatively, data may include data values outside this range, in which case, data values greater than the highest decision value $D_{12}$ are quantized to the highest quantizing level and data values less than the least decision value $D_{-1-2}$ are quantized to the lowest quantizing level. In the linear quantizing scheme illustrated in FIG. 1, the decision values fall half-way between the quantizing values as a result of the data values being quantized to the nearest quantizing value.

As mentioned above, a non-linear quantizing scheme can be implemented according to the prior art by first pre-processing or transforming the data subject to quantizing using a non-linear function, and then linearly quantizing the resulting pre-processed data. If f() is the non-linear function, and linear quantizing of x is expressed as Q[x], then non-linear quantizing of x may be expressed as Q[f(x)].

A block diagram of a prior art non-linear quantizer is shown in FIG. 2. In FIG. 2, the data subject to quantizing are fed via the input terminal 10 to the pre-processor 21, which, in this example, receives the non-linear function f() from the non-linear function block 23. The pre-processor pre-processes each of the data subject to quantizing according to the non-linear function received from the non-linear function block. The pre-processed data are fed from the pre-processor 21 to the linear quantizer 22. The linear quantizer 22 uses uniformly-spaced quantizing values set according to data received via the input terminal 11 indicating the number of quantizing levels. The linear quantizer 22 quantizes the pre-processed data to the nearest uniformly-spaced quantizing value and feeds the resulting non-linearly quantized data to the output terminal 14.

Note that linear quantizing is a special case of the non-linear quantizing just described. If the non-linear function f() is defined as f(x)=x, then the data are quantized linearly, as shown in FIG. 3. In FIG. 3, the data value a is first pre-processed by the linear function f(x)=x, and, and the resulting pre-processed data value a' on the vertical axis is then linearly quantized by Q[]. Since the function f(x) is linear with a slope of 1.0, the result of Q[f(x)] is the same as Q[x]. In the example shown in FIG. 3, the pre-processed data value is greater than the decision value $D_{12}$ between quantizing levels 1 and 2, so the data value a is quantized with a quantizing level of 2.

When f(x) is a non-linear function, the quantizing scheme Q[f(x)] becomes a non-linear quantizing scheme according to the prior art. FIG. 4 shows an example of this form of non-linear quantizing. As in the example of linear quantizing described above with reference to FIG. 3, the data are pre-processed by the function f(x), and the pre-processed data are then quantized linearly in the non-linearized domain shown on the vertical axis in FIG. 4. However, in this case, the function f(x) is non-linear.

Pre-processing using the non-linear function f(x) has the effect of changing the quantizing value in the input domain (the horizontal axis in FIG. 4) of each of the quantizing levels. FIG. 5 shows the result of this effect. FIG. 5 illustrates the same quantizing scheme as FIG. 4 except that each quantizing value q has been inversely transformed back from the transformed domain (the vertical axis in FIG. 5) to the input domain (the horizontal axis) by the inverse g(q) of the non-linear function f(x). Thus, FIG. 5 shows the level in the input domain of the quantizing value of each quantizing level in the transformed domain. It can be seen that the quantizing values are uniformly spaced in the transformed domain, but are non-uniformly spaced in the input domain. Since, in this example, the slope of the non-linear function f(x) is greater for data values near zero than for data values near 1.0 and −1.0, the non-linear quantizing scheme shown is more precise for small data values.

FIG. 6 shows the quantizing values of FIG. 5 in the same format as FIG. 1, using only the input domain. FIG. 6 also shows the corresponding decision values. The decision values are calculated in the same way as the quantizing values are calculated in FIG. 5, i.e., by inversely transforming the decision values in the transformed domain, (the vertical axis of FIG. 5) back to the input domain (the horizontal axis of FIG. 5). It can be seen that the decision values are no longer located half-way between the quantizing values in the input domain. Because of this, certain data values may not be quantized with a minimum quantizing error.

The non-linear quantizer prescribed by the above-mentioned ISO/MPEG layer three audio coding standard has additional disadvantages. First, the quantizing effects of a given non-linear function f() vary according to the number of quantizing levels used to quantize the data values after they have been pre-processed according to the non-linear function f(). However, the quantizer prescribed by the standard changes the number of quantizing levels while using a fixed non-linear function f(). In a quantizer in which the number of quantizing levels changes dynamically, as in most high-efficiency compression systems, pre-processing using a fixed non-linear function f() will not give optimum results for all values of the number of quantizing levels.

Second, calculating f(x) for each of the data for the non-linear function f() may require too much time and/or signal processing power. To conserve time or processing power, the data values may have to be pre-processed using a simpler, but less optimum, non-linear function f().

SUMMARY OF THE INVENTION

The invention provides a method of non-linearly quantizing data representing an information signal to generate respective quantized data that represent the information signal using fewer bits. Each of the data, when non-linearly quantized, is represented by a quantizing level selected from a number of quantizing levels. The method non-linearly quantizes the data according to a non-linear function. In the method, the data and word-length information indicating the number of quantizing levels are received. A quantizing value for each quantizing level in the number of quantizing levels is determined from the word-length information and the non-linear function. The quantizing values determined for all the quantizing levels in the number of quantizing levels are non-uniformly spaced. Finally, the quantizing level having the quantizing value closest In value to the data value of each of the data is selected as a respective one of the quantized data.

When the quantizing values are determined, an inverse non-linear function, inverse to the non-linear function, is derived from the non-linear function. The number of quantizing levels are distributed uniformly across the output range of the non-linear function to generate a corresponding number of uniformly-spaced values. Then, each of the uniformly-spaced values is processed using the inverse non-linear function to generate a respective one of the quantizing values.

The method may additionally include performing time-frequency analysis on the information signal to generate the data.

The method may additionally include applying block floating to the data prior to quantizing, in which case, the quantizing level having the quantizing value closest in value to the value of each of the block floating-processed data is selected as a respective one of the quantized data.

A decision value between adjacent quantizing levels may be calculated from the quantizing values of the adjacent quantizing levels, and an input range for each quantizing level may be determined from the decision values between the quantizing level and the quantizing levels above and below the quantizing level. In this case, the quantizing level having the input range encompassing the data value of each of the data is selected as the respective one of the quantized data.

The quantizing levels and their respective quantizing values or input ranges may be stored in a quantizing table. In this case, the quantizing level is selected by comparing the data value of the one of the data with the input ranges stored in the quantizing table to identify the input range encompassing the data value, or by comparing the data value with the quantizing values stored in the quantizing table to identify the quantizing value closest to the data value. The respective quantizing level is then read from the quantizing table as the respective one of the quantized data.

Quantizing tables may be constructed for all allowable values of the number of quantizing levels, and the quantizing table used to provide the quantizing level is selected in response to the word-length information indicating the number of quantizing levels.

The data may be non-linearly quantized using different non-linear functions selected according to the number of quantizing levels. This allows the non-linear function used when the number of quantizing levels is large to be more non-linear than the non-linear function used when the number of quantizing levels is small. This, in turn, provides the advantages of non-linear quantizing while avoiding the high distortion levels that can result when non-linear quantizing is used with only a few quantizing levels.

Different non-linear functions may be implemented using quantizing tables, or by determining quantizing values or input ranges for each non-linear function.

The invention also provides a method of quantizing data representing an information signal to generate respective quantized data representing the information signal using fewer bits. Each of the data, when quantized, is represented by a quantizing level selected from a number of quantizing levels. In the method, the data and word-length information indicating the number of quantizing levels are received. A set of quantizing tables is provided. The set of quantizing tables includes a quantizing table for each possible number of quantizing levels. Each quantizing table includes a table entry for each quantizing level in the respective number of quantizing levels. The quantizing table for the number of quantizing levels indicated by the word-length information is chosen from the set of quantizing tables. Finally, the quantizing level whose table entry corresponds to the data value of each of the data is selected from the quantizing table as a respective one of the quantized data.

The table entries in the quantizing tables may provide a non-linear quantizing characteristic, and may be derived from a single non-linear function which determines the non-linear quantizing characteristic.

The table entries in the quantizing tables may provide a different non-linear quantizing characteristic in different ones of the quantizing tables. In this case, the table entries in the quantizing tables for more quantizing levels may provide a more non-linear quantizing characteristic than the table entries in the quantizing tables for fewer quantizing levels.

The table entries may include a quantizing value or a input range for each quantizing level. When the quantizing value is included, the quantizing level of the table entry in which the quantizing value is closest to the data value of the one of the data is selected. When the input range is included, the quantizing level of the table entry in which the input range encompasses the data value of the one of the data is selected.

The method may additionally include performing time-frequency analysis on the information signal to generate the data.

The method may also additionally include applying block floating to the data to generate block floating-processed data, in which case, the quantizing level whose table entry corresponds to the block floating-processed data value of each one of the block floating-processed data is selected as a respective one of the quantized data.

The invention additionally provides a method of non-linearly quantizing data representing an information signal to generate respective quantized data representing the information signal using fewer bits. Each of the data, when non-linearly quantized, is represented by a quantizing level selected from a number of quantizing levels. In the method, a set of non-linear functions is provided. The non-linear functions each define a non-linear quantizing characteristic. The data and word-length information indicating the number of quantizing levels are received. One of the non-linear functions is chosen from the set of non-linear functions, preferably in response to the word length input. The data are pre-processed to generate pre-processed data by multiplying each of the data by the chosen non-linear function to generate a respective one of the pre-processed data. Finally, the pre-processed data are linearly quantized in response to the word-length information to generate the quantized data.

A different non-linear function may be provided for each number of quantizing levels in the allowable range of the number of quantizing levels.

The non-linear functions may vary in non-linearity, in which case, the one of the non-linear functions chosen has a greater non-linearity when the word-length information indicates more quantizing levels than the one of the non-linear functions chosen when the word-length information indicates fewer quantizing levels.

A piecewise linear approximation of a non-linear function may be provided as each of the non-linear functions in the non-linear function set. A piecewise approximation of a non-linear function would be provided for each number of quantizing levels in the allowable range of the number of quantizing levels. Each piecewise linear approximation includes plural nodes at which the piecewise non-linear approximation coincides with the non-linear function. The nodes are equal in number to the respective number of quantizing levels. Each piecewise linear approximation also includes linear segments interconnecting consecutive nodes. Substituting the linear piecewise approximations of the non-linear functions for the non-linear function themselves reduces the quantizing errors generated by this method.

The non-linear functions approximated by the piecewise linear approximations may vary in non-linearity, in which case, the non-linear functions approximated by the piecewise linear approximations for larger numbers of quantizing levels are preferably more non-linear than the non-linear functions approximated by the piecewise linear approximations for smaller numbers of quantizing levels. Alternatively, the piecewise linear approximations may all approximate the same non-linear function.

The method may additionally include performing time-frequency analysis on the information signal to generate the data.

The method may also additionally include applying block floating to the data to generate block floating-processed data, in which case, the pre-processed data are generated by multiplying each of the block-floating processed data by the chosen non-linear function.

Finally, the invention provides a method of dequantizing the non-linearly quantized data quantized by the method just described. In the method, a set of inverse non-linear functions is provided. The inverse non-linear functions each correspond to one of the plural non-linear functions used to quantize the data. The non-linearly quantized data and word-length information indicate the number of quantizing levels with which the non-linearly quantized data are quantized are received. The non-linearly quantized data are linearly dequantized in response to the word-length information to generate non-linear data. One of the inverse non-linear functions is chosen from the set of non-linear functions. Finally, the non-linear data are post processed to generate the dequantized data by applying the chosen inverse non-linear function to each of the non-linear data to generate a respective one of the dequantized data.

The one of the inverse non-linear functions may be chosen in response to the word-length information.

The inverse non-linear functions may vary in non-linearity, in which case, the chosen one of the inverse non-linear functions will preferably have a greater non-linearity when the word-length information indicates more quantizing levels than when the word-length information indicates fewer quantizing levels.

Block floating release may additionally be applied to the dequantized data following the post processing.

BRIEF DESCRIPTION OF THE DRAWINGS

FIG. 13 is a block diagram of the time-frequency analyzer in the audio compressor of the audio signal transmission system shown in FIG. 11.

FIG. 14 is a block diagram of a non-linear quantizer embodying the second non-linear quantizing method according to the invention.

FIG. 15 is an example of the quantizing table for five quantizing levels used in the second non-linear quantizing method according to the invention.

DETAILED DESCRIPTION OF THE INVENTION

Figure 7:
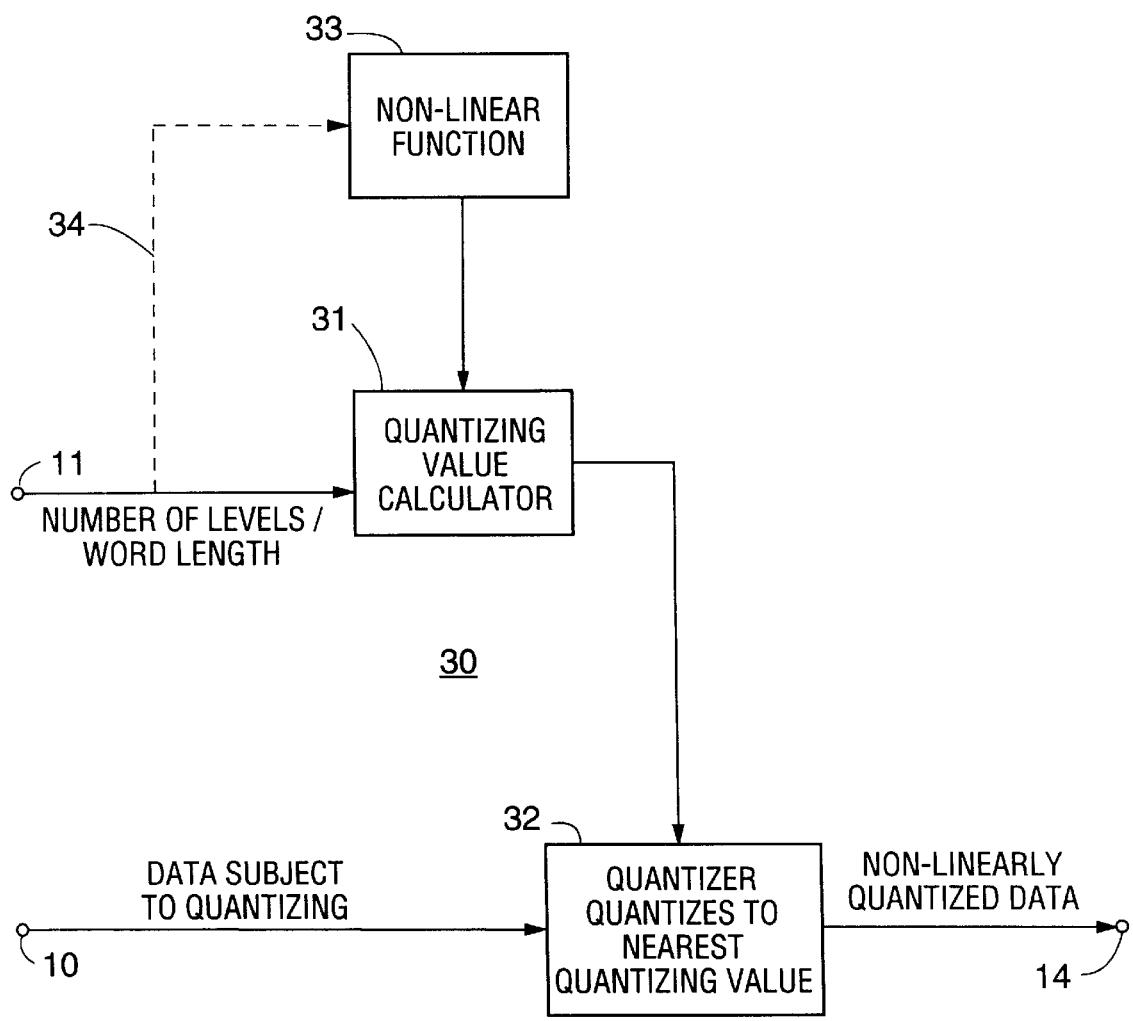
FIG. 7 is a block diagram of a non-linear quantizer embodying the first non-linear quantizing method according to the invention.

A block diagram of a non-linear quantizer 30 embodying the first non-linear quantizing method according to the invention is shown in FIG. 7. The non-linear quantizer 30 and the other non-linear quantizers and non-linear dequantizers described herein are shown as block diagrams. The functional elements of these block diagrams may be realized in practice using a suitable large-scale integrated circuits, or using smaller-scale integrated circuits or discrete components. Alternatively, the functional elements of the non-linear quantizers and dequantizers may be realized by programming a suitable microcomputer or digital signal processor and using such auxiliary circuits as may be required.

In the non-linear quantizer 30, the quantizer 32 receives the data subject to quantizing via the input terminal 10, quantizes each of the data subject to quantizing to the quantizing level corresponding to the nearest quantizing value in the set of non-uniformly spaced quantizing values supplied by the quantizing value calculator 31, and supplies the resulting quantized data to the output terminal 14. The data subject to quantizing received via the input terminal 10 are normally a block or set of data, such as a set of spectral coefficients, that are to be quantized using the same number of quantizing levels or the same word length.

The quantizing value calculator 31 receives the non-linear function f() from the non-linear function block 33, and receives via the input terminal 11 an input indicating the number of quantizing levels with which the data subject to quantizing are to be quantized. The quantizing value calculator calculates a quantizing value for each quantizing level, and feeds the resulting quantizing values to the quantizer 32. The number of quantizing values calculated is equal to the number of quantizing levels indicated by the input indicating the number of quantizing levels. The quantizing value calculator 31 may receive via the input terminal 11 an input indicating the word length with which the data subject to quantizing will be quantized in lieu of the input indicating the number of quantizing levels.

Figure 8:
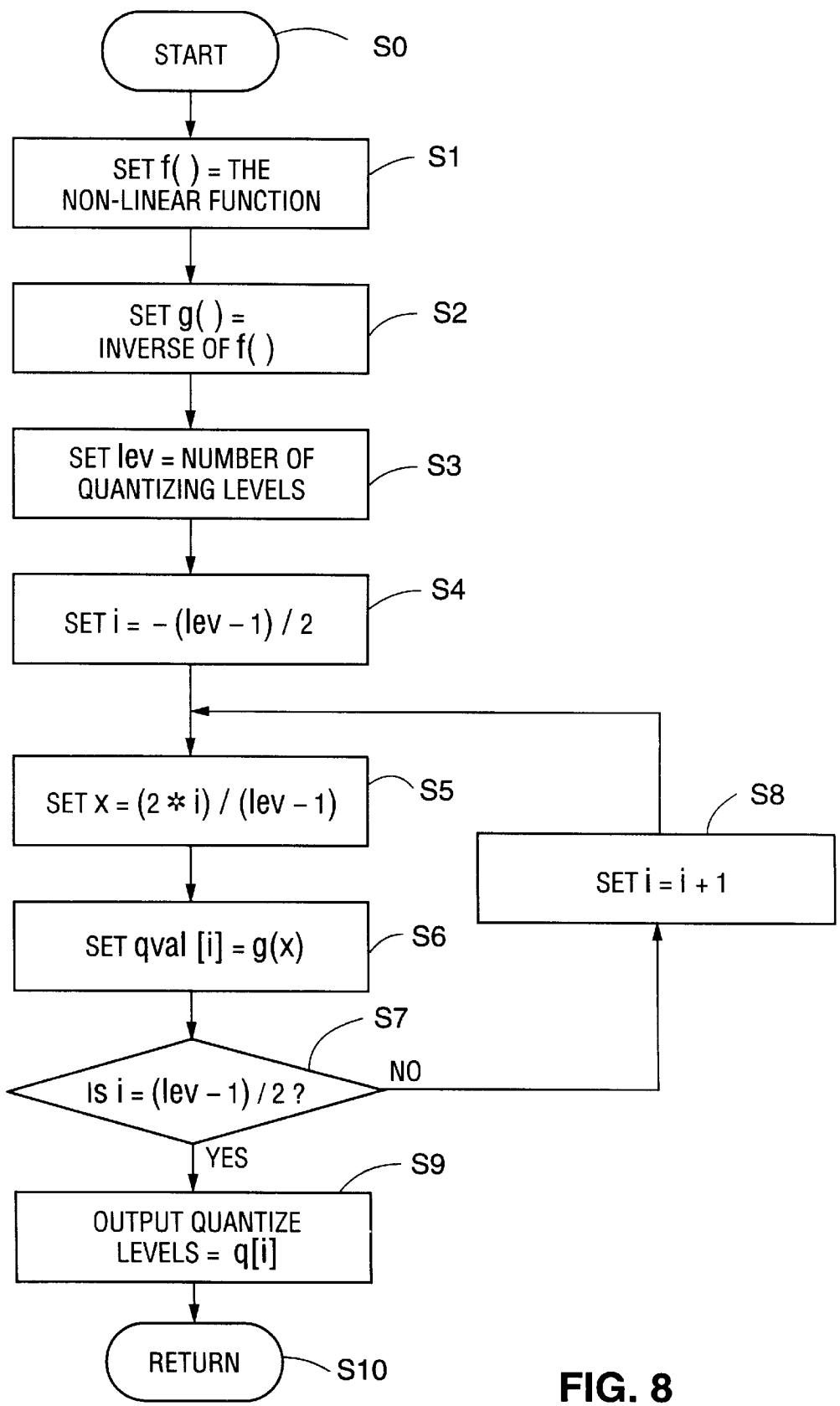
FIG. 8 is a flow chart illustrating the calculation of the quantizing values for each quantizing level in the first non-linear quantizing method according to the invention.

FIG. 8 is a flow chart explaining in more detail the calculation of the quantizing value of each quantizing level by the quantizing value calculator 31. In the processing shown in FIG. 8, the corresponding linear quantizing value x in the transformed domain is first calculated for each quantizing level i. Then, the corresponding quantizing value q[i] in the input domain is calculated as q[i]=g(x), where go is the inverse function of the non-linear function f(), i.e., g(f(x))=x.

The processing starts at step S0. At step S1, an input indicating the non-linear function f() is received from the non-linear function block 33. At step S2, the inverse function g() of the function f() is calculated from the non-linear function f(). At step S3, an input indicating the number of quantizing levels lev is received via the input terminal 11. At step S4, the quantizing level i is initialized to the lowest quantizing level using equation (1):

$$i=-(lev-1)/2 \qquad (1)$$

The quantizing value q[i], in the input domain for each quantizing level i is then calculated by the loop consisting of steps S5, S6, S7, and S8 until it is determined at step S7 that the quantizing values for all the quantizing levels have been calculated.

At step S5, the linear quantizing value x in the transformed domain for the quantizing level i is calculated using equation (2):

$$x=(2\times i)/(lev-1) \qquad (2)$$

At step S6, the quantizing value q[i] in the input domain is calculated from the quantizing value in the transformed domain and the inverse function g() using equation (3)

$$q[i]=g(x) \qquad (3)$$

At step S7, a test is performed to determine whether the quantizing values for all the quantizing levels have been calculated by determining whether the value of i corresponds to the highest quantizing level determined by equation (4):

$$i=(lev-1)/2 \qquad (4)$$

If it is determined at step S7 that the value of i does not correspond to the highest quantizing level, execution passes to step S8, where the value of i is incremented by 1, and then to step S5 where the loop repeats.

If it is determined at step S7 that the value of i corresponds to the highest quantizing level, this indicates that quantizing values have been determined for all the quantizing levels, and execution passes to step S8. At step S8, the quantizing values calculated by the quantizing value calculator 31 are fed to the quantizer 32 for use in quantizing the data subject to quantizing. Processing then advances to step S9, where control returns to the main routine.

The quantizer 32 quantizes each of the data subject to quantizing by feeding to the output terminal 14 a quantizing level selected from the number of quantizing levels indicated by the input indicating the number of quantizing levels (or the number of quantizing levels corresponding to the word length input) received via the input terminal 11. The quantizer 32 also receives a quantizing value for each quantizing level from the quantizing value calculator 31 for use in quantizing the data subject to quantizing to the nearest quantizing value. For example, the quantizer 32 may determine which of the quantizing values received from the quantizing value calculator 31 is closest in value to each of the data subject to quantizing, and will feed the quantizing level corresponding to that quantizing value to the output terminal 14 as one of the quantized data. Each quantizing level fed to the output terminal 14 has the number of bits indicated by the word length input (or has the number of bits corresponding to the input indicating the number of quantizing levels) received by the quantizer 32 from the input terminal 11. The quantizer 32 can determine which of the quantizing values is closest in value to each of the data subject to quantizing by, for example, determining differences between the one of the data and each of the quantizing values, and feed to the output terminal 14 the quantizing level corresponding to the quantizing value for which the difference is least.

Figure 5:
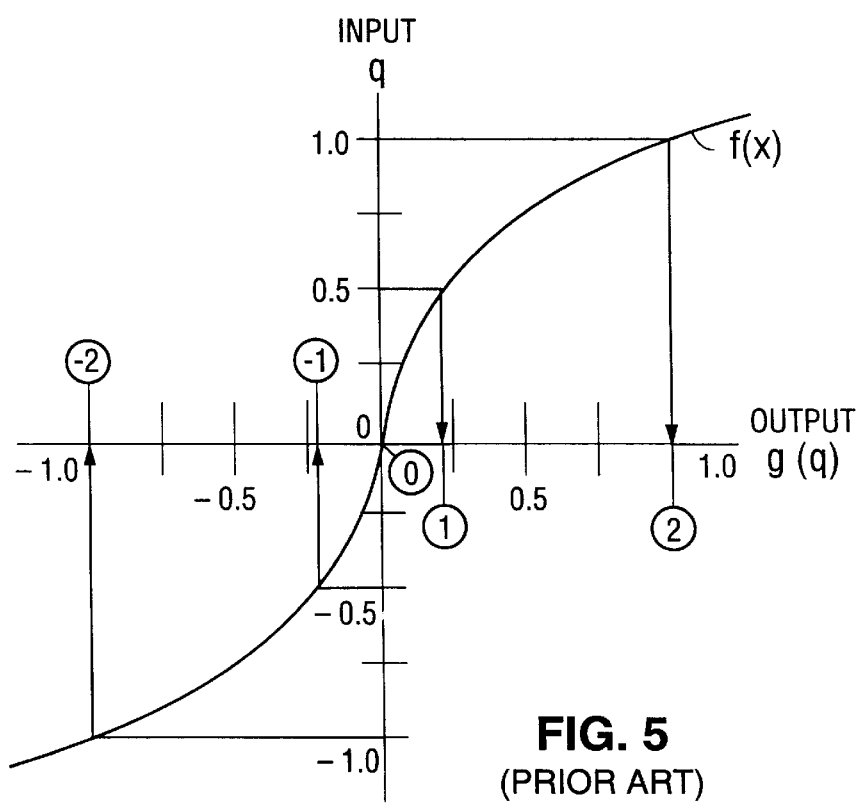
FIG. 5 is an input/output diagram illustrating the quantizing value of each quantizing level generated by non-linear quantizing according to the prior art.

The processing performed on the quantizing levels by the quantizing value calculator 31 results in quantizing values that coincide with the quantizing values shown in FIG. 5 of a prior-art non-linear quantizer using the same nonlinear function f(). However, the non-linear quantizing performed by the first quantizing method according to the invention is different from that shown in FIG. 5 because the quantizer 32 operates in the input domain and quantizes each of the data subject to quantizing to the quantizing level corresponding to the closest non-uniformly spaced quantizing value. This results in decision values that are located at the midpoints between adjacent quantizing values, unlike the decision values of the prior-art non-linear quantizer described above with reference to FIGS. 5 and 6. As a result, the first non-linear quantizing method according to the invention generates quantizing errors that are less than or equal to the quantizing errors generated by prior-art non-linear quantizing.

Figure 9:
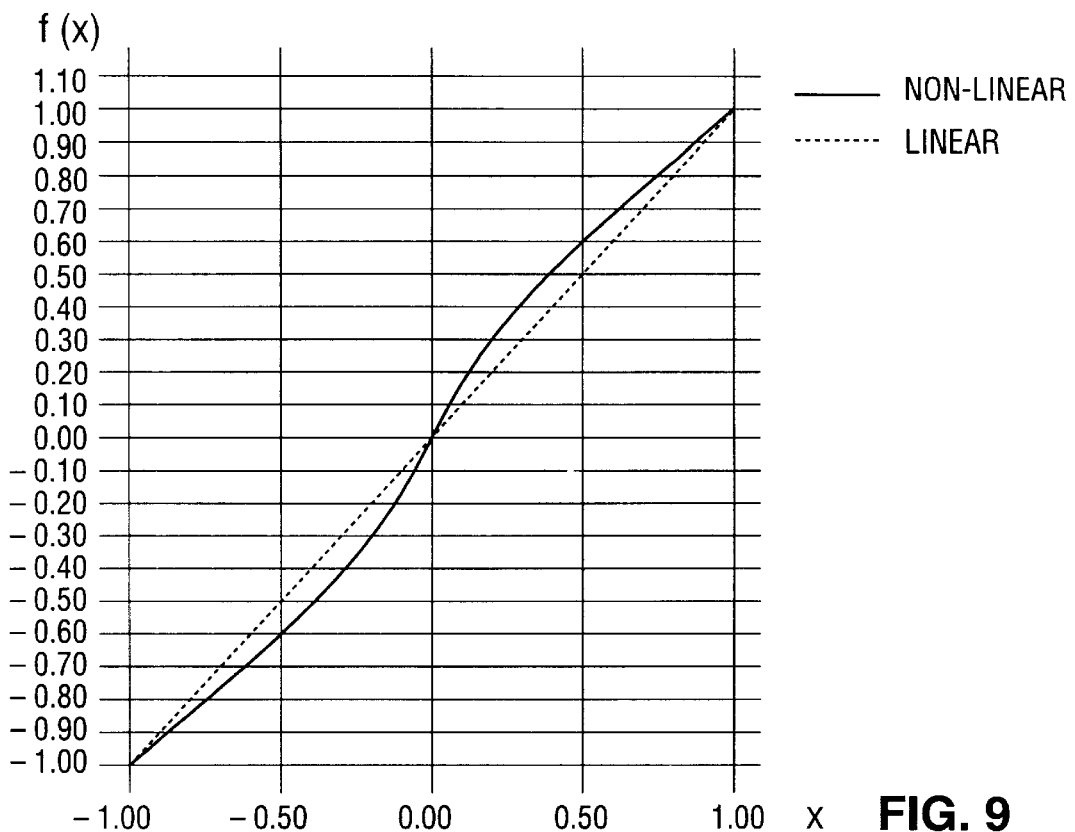
FIG. 9 is a graph showing an exemplary non-linear function that could be used by the first non-linear quantizing method according to the invention. The graph also shows a linear function for comparison.
Figure 10A:
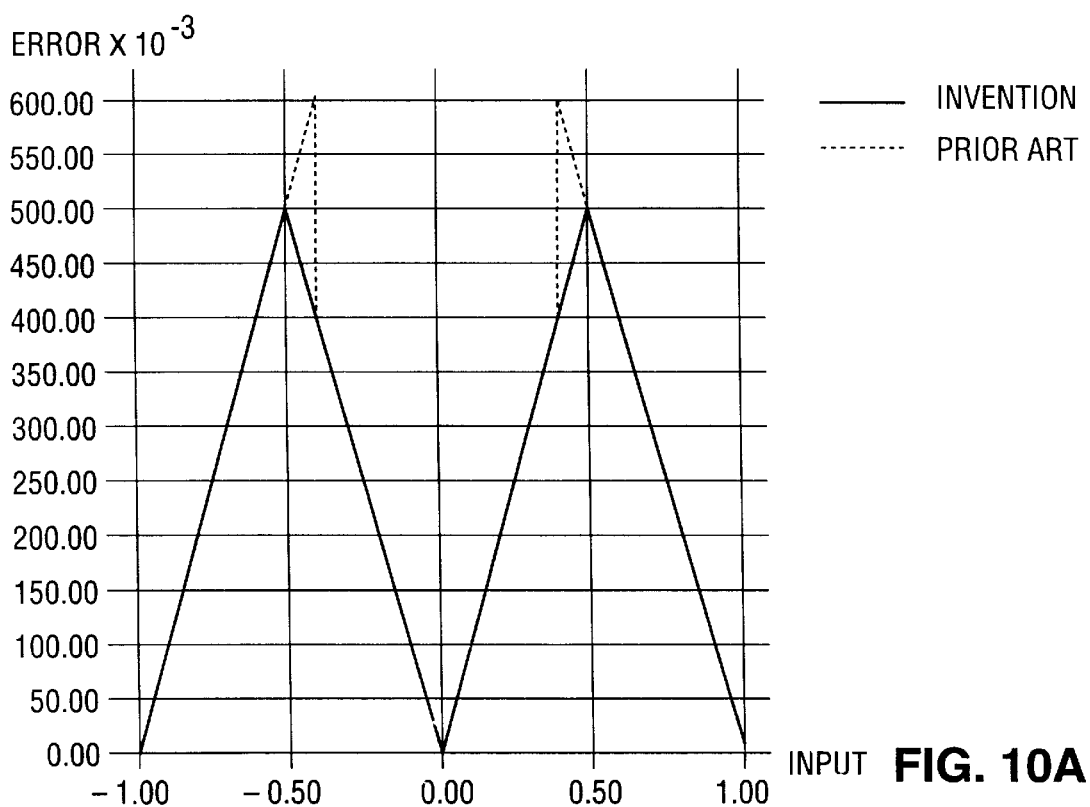
FIG. 10A is a graph showing the absolute value of the quantizing errors resulting from non-linear quantizing with three quantizing levels performed according to the invention. The graph also shows the absolute value of the quantizing errors resulting from non-linear quantizing with three quantizing levels performed according to the prior art for comparison.
Figure 10B:
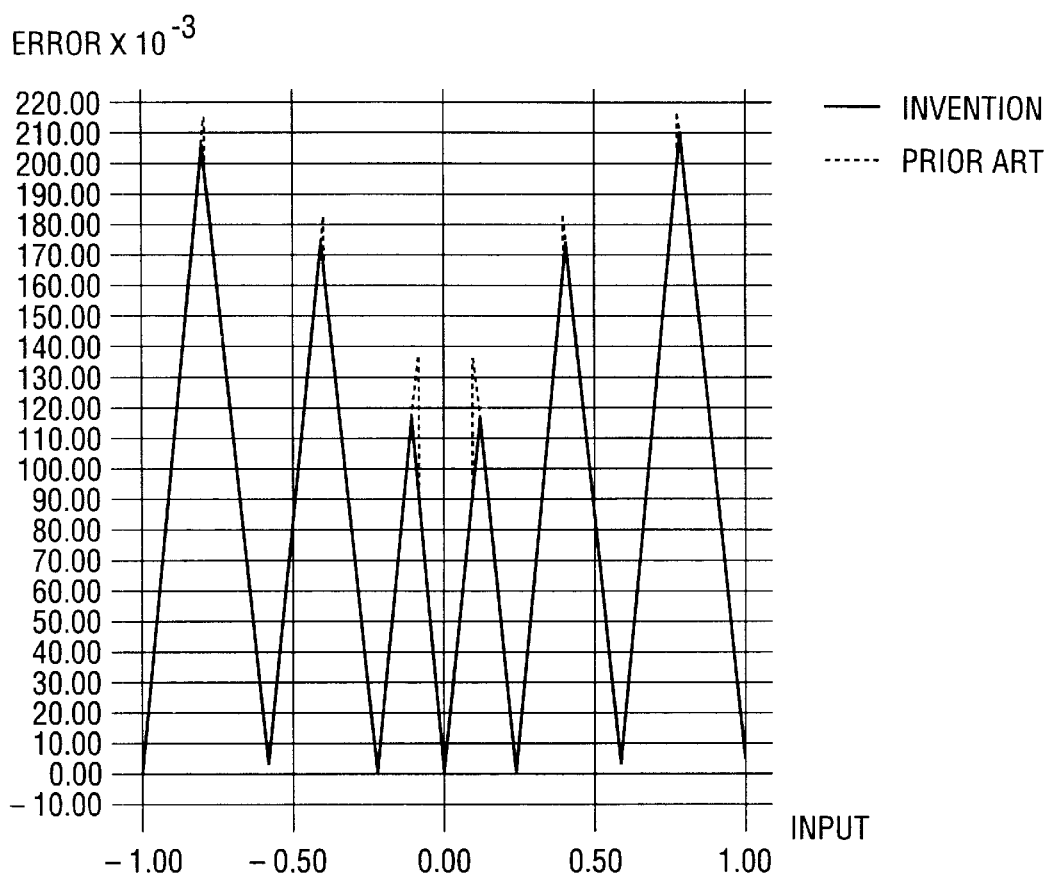
FIG. 10B is a graph showing the absolute value of the quantizing errors resulting from non-linear quantizing with seven quantizing levels performed according to the invention. The graph also shows the absolute value of the quantizing errors resulting from non-linear quantizing with seven quantizing levels performed according to the prior art for comparison.

The solid line in FIG. 9 shows an exemplary non-linear function; the dotted line indicates a linear function, for comparison. FIGS. 10A and 10B show the quantizing errors generated by the non-linear quantizing method according to the present invention (solid line) compared with the quantizing errors generated by prior-art non-linear quantizing (dotted line) when both operate with the exemplary non-linear function shown by the solid line in FIG. 9. FIG. 10A shows the quantizing errors that result when data values in the range of −1.0 to +1.0 are quantized using three quantizing levels. It can be seen that the non-linear quantizing method according to the invention generates significantly smaller quantizing errors for data values in the vicinity of −0.4 and +0.4. FIG. 10B shows the quantizing errors that result when data values in the same range are quantized using seven quantizing levels. In both the cases illustrated, the quantizing errors generated by the non-linear quantizing method according to the invention are less than or equal to the quantizing errors generated by prior-art non-linear quantizing.

As an alternative to feeding the quantizing value for each quantizing level to the quantizer 32, the quantizing value calculator 31 can calculate and feed to the quantizer 32 an input range for each quantizing level in the number of quantizing levels. This enables the quantizer 32 to be simplified. The quantizing value calculator 31 can determine from the quantizing values calculated as described above a decision value mid-way between adjacent quantizing values. Setting the decision value mid-way between adjacent quantizing values minimizes the quantizing errors. The quantizing value calculator can then derive an input range for each quantizing level from the calculated decision values of adjacent quantizing levels. The quantizing value calculator can feed the calculated input range for each quantizing level to the quantizer 32 in lieu of the respective quantizing value. The quantizer 32 can then quantize the data subject to quantizing simply by determining which of the input ranges received from the quantizing value calculator encompasses the data value of each of the data subject to quantizing and feeding the respective quantizing level to the output terminal 14.

An example of the application of a non-linear quantizer embodying the first non-linear quantizing method according to the invention in a transmission or recording system for an audio signal will now be described with reference to FIGS.

11–13. The non-linear quantizing method according to the invention is not limited to this application, however. The non-linear quantizing method according to the invention will confer the advantages described above when used in other non-linear quantizing applications. For example, the non-linear quantizing method according to the invention may be used to non-linearly quantize the coefficients that result from orthogonally transforming a square or rectangular block of a motion picture signal, or a square or rectangular block of errors resulting from performing motion compensation on a motion picture signal.

Figure 11:
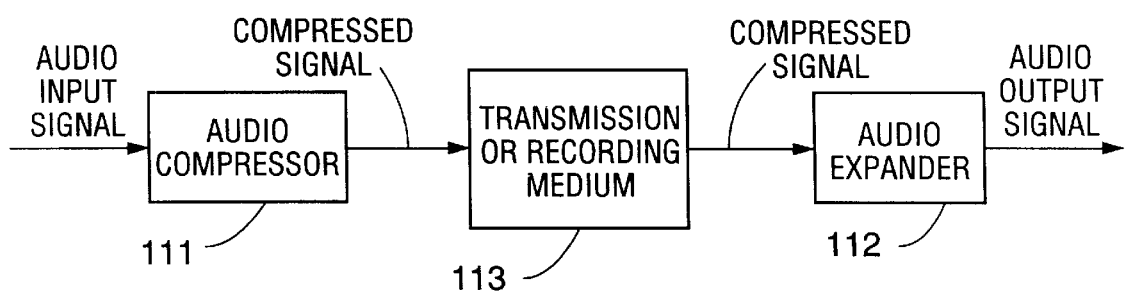
FIG. 11 is a block diagram of an audio transmission or recording system in which the audio signal is compressed using the non-linear quantizing methods according to the invention prior to transmission or recording.

FIG. 11 shows the general configuration of the transmission or recording system 110 for an audio signal. In the system shown, the audio input signal is compressed prior to recording or transmission to reduce the storage capacity requirements of the recording medium and/or the bit rate requirements of the transmission medium. The audio input signal is compressed by the audio compressor 111 to provide a compressed signal that is fed to the transmission or recording medium 113. The compressed signal reproduced from the transmission or recording medium is then expanded by the audio expander 112 to provide an audio output signal. The system 110 normally operates according to the psychoacoustic characteristics of the human sense of hearing to minimize the audibility of errors resulting from the process of compressing and expanding the audio input signal.

Figure 12:
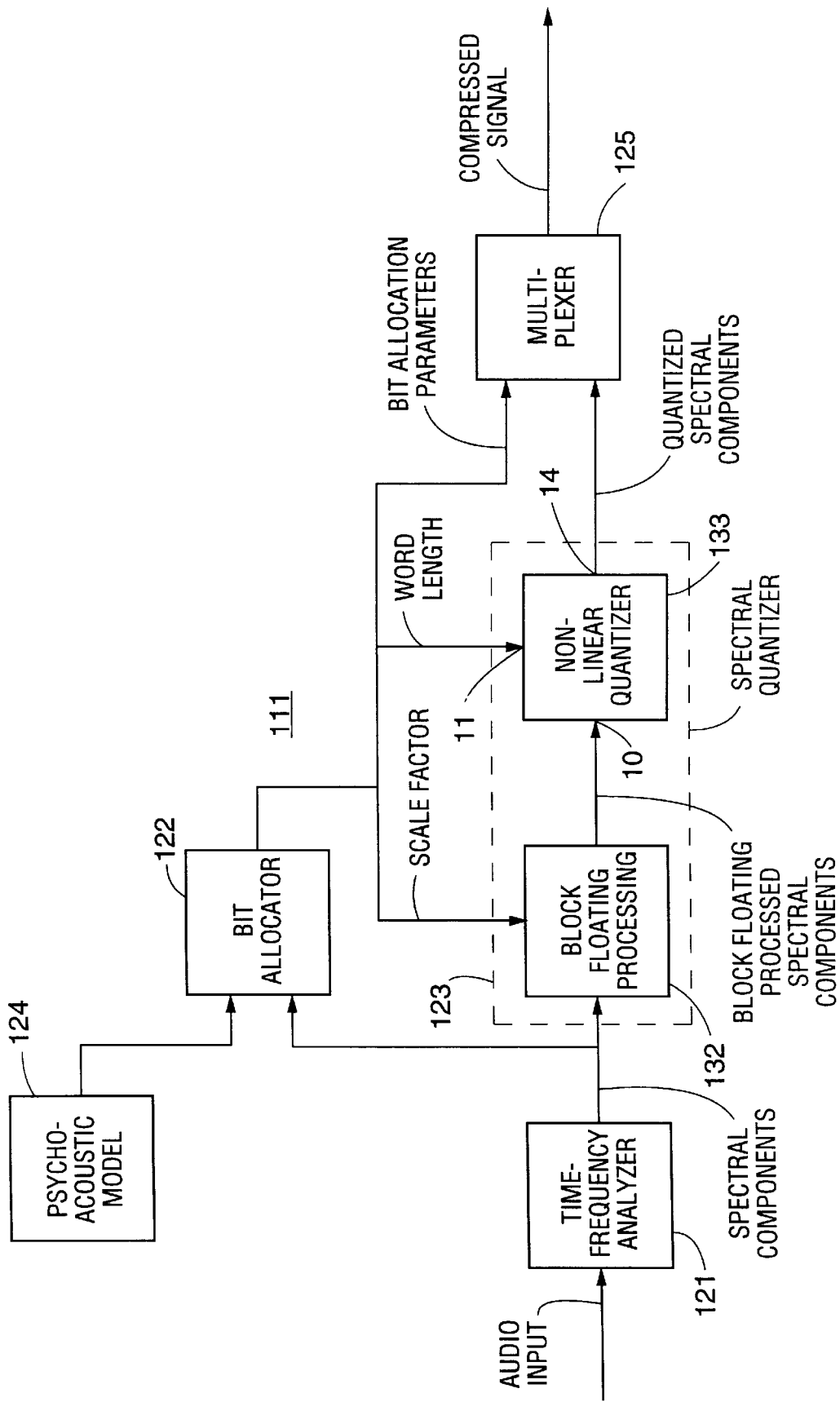
FIG. 12 is a block diagram of the audio compressor of the audio signal transmission system shown in FIG. 11. The compressor includes a non-linear quantizer embodying the non-linear quantizing methods according to the invention.

FIG. 12 shows a block diagram of the audio compressor 111 that operates according to the psychoacoustic characteristics of the human sense of hearing. The time-frequency analyzer 121 receives the audio input signal and divides the audio input signal in time and in frequency into sets of spectral components. For example, the time-frequency analyzer may divide the audio input signal in time into blocks, and may then orthogonally transform the samples of the audio input signal in each block from the time domain to the frequency domain to generate the sets of spectral components. Alternatively, the time-frequency analyzer may divide the audio input signal into multiple frequency bands, using, for example, multiple filters, and may divide the signal component in each of the frequency bands in time into the sets of spectral components. The time-frequency analyzer 121 feeds the sets of spectral components to the bit allocator 122 and the spectral quantizer 123.

In the audio compressor shown in FIG. 12, the accuracy with which the spectral components in each set of spectral components is represented using a predetermined number of bits is increased by applying block floating processing to each set of spectral components prior to quantizing them. The bit allocator 122 determines a scale factor for each set, and the spectral quantizer 123 divides each spectral component in the set by the scale factor. The resulting mantissas are then quantized. In practice, as will be described in more detail below, the spectral components in each set of spectral components are divided by frequency into frequency bands, the bit allocator 122 determines a scale factor for each frequency band, and the spectral quantizer 123 applies block floating processing to the spectral components in each frequency band using the respective scale factor.

The bit allocator 122 adaptively determines the word length and scale factor for quantizing the spectral coefficients in each set of spectral components, and feeds the scale factor and word length to the spectral quantizer 123. The spectral quantizer 123 uses the scale factor and word length to non-linearly quantize the spectral components in the respective set of spectral components by, for example, block floating processing and non-linear quantizing, to generate a set of non-linearly quantized spectral components. Finally, the bit allocator 122 feeds the bit allocation parameters and the spectral quantizer 123 feeds the respective set of non-linearly quantized spectral components to the multiplexer 125. The multiplexer multiplexes the bit allocation parameters and the non-linearly quantized spectral components to form the compressed signal for feeding to the recording or transmission medium 113.

To ensure that the quantizing noise resulting from the non-linear quantizing performed by the spectral quantizer 123 remains subjectively inaudible, or minimally audible, to the listener, the bit allocation processing performed by the bit allocator 122 is based on a psychoacoustic model schematically represented by the psychoacoustic model 124. The psychoacoustic model used by the bit allocation processing might typically include such data as threshold-of-detection curves, equal loudness curves, simultaneous masking characteristics, and temporal masking characteristics.

In the audio compressor 111 embodying the non-linear quantizing method according to the invention, the spectral quantizer 123 shown in FIG. 12 may employ the first non-linear quantizing method according to the invention, described above with reference to FIGS. 7 and 8. Other embodiments of the non-linear quantizing method that will be described below can also be substituted for the first non-linear quantizing method in the spectral quantizer 123. The spectral quantizer 123 will now be described with reference to FIG. 12.

In the spectral quantizer 123, the block floating processor 132 receives the sets of spectral components from the time/frequency analyzer 121 and receives the respective scale factor for each set from the bit allocator 122. The block floating processor 132 applies block floating processing to each set of spectral components by dividing the spectral components in the set by the respective scale factor. The resulting sets of block floating-processed spectral components are fed to the non-linear quantizer 133 via the input terminal 10. The non-linear quantizer 133 also receives the word length for each set of spectral components from the bit allocator 122 via the input terminal 11, and non-linearly quantizes each set of block floating-processed spectral components in response to the word length. The non-linear quantizer feeds the resulting set of quantized spectral components to the multiplexer 125 via the output terminal 14.

When the non-linear quantizer described above with reference to FIG. 7 and embodying the first non-linear quantizing method is used as the non-linear quantizer 133, the quantizer 32 quantizes each of the block floating-processed spectral components in the set of block floating-processed spectral components received from the block floating processor 132 via the input terminal 10. The quantizer 32 quantizes the block floating-processed spectral components to the nearest quantizing value in the number of quantizing values calculated by the quantizing value calculator 31. The quantizing value calculator 31 calculates the number of quantizing values using the non-linear function from the non-linear function block 33 and from the input indicating the respective word length received via the input terminal 11. The quantizer 32 feeds the resulting set of quantized spectral components to the multiplexer 125 via the output terminal 14.

In the audio compressor 111, the time-frequency analyzer 121 may be based on a hybrid of transform and subband coding, although it is not limited to such a structure. An example of the time-frequency analyzer 121 incorporating the ATRAC hybrid coding technique, used, for example, for compressing a PCM audio signal to generate the compressed signal for recording on a MiniDisc, is shown in FIG. 13. The input terminal 151 is supplied with a PCM audio input signal in the frequency range of, e.g., 0 Hz to 20 kHz. The audio input signal is divided into a frequency range signal in the frequency range of 0 Hz to 10 kHz and a high frequency range signal in the frequency range of 10 to 20 kHz by the frequency range division filter 153. The frequency range signal in the frequency range of 0 Hz to 10 kHz is further divided into a low frequency range signal in the frequency range of 0 Hz to 5 kHz and a middle frequency range signal in the frequency range of 5 to 10 kHz by the frequency range division filter 155. Quadrature mirror filters (QMFs) are preferably used as the frequency range division filters 153 and 155.

Alternatively, when the PCM audio input signal has a frequency range of 0 Hz to 22 kHz, the high frequency range signal has a frequency range of 11 kHz to 22 kHz, the middle frequency range signal has a frequency range of 5.5 kHz to 11 kHz, and the low frequency range signal has a frequency range of 0 Hz to 5.5 kHz.

The frequency range signal in the high frequency range is fed from the frequency range division filter 153 to the high-frequency orthogonal transform circuit 157, the frequency range signal in the middle frequency range is fed from the frequency range division filter 155 to the middle-frequency orthogonal transform circuit 159, and the frequency range signal in the low frequency range is fed from the frequency range division filter 159 to the low-frequency orthogonal transform circuit 161.

The orthogonal transform circuits 157, 159, and 161, which are preferably modified discrete cosine transform (MDCT) circuits, orthogonally transform frames of the respective frequency range signals to collectively generate respective sets of spectral components for feeding to the bit allocator 122 and the spectral quantizer 123. The sets of spectral components collectively generated by the orthogonal transform circuits 157, 159, 161 are fed to the output terminal 165, whence they are fed to the bit allocator 122 and the spectral quantizer 123.

The audio input signal received by the input terminal 151 is notionally divided into frames of a predetermined number of samples. The orthogonal transform circuits 157, 159, and 161 orthogonally transform the frames of the three frequency range signals derived from each frame of the audio input signal to collectively generate a set of spectral components. To provide further flexibility and to eliminate audible time-domain artifacts, such as noise modulation, the orthogonal transform circuits 157, 159, and 161 orthogonally transform the each frame of the frequency range signals in blocks having a variable block length. The block length in which each frequency range signal is orthogonally transformed is equal to the frame length divided by $2^n$, where n is a positive integer equal to or greater than zero. The block lengths in which each frame of the audio input signal is orthogonally transformed in the three frequency ranges are decided by the block length decision block 163 on the basis of the dynamic spectral characteristics of the digital input signal. In general, the high-frequency range signal is orthogonally transformed in blocks having a shorter block length than the low- and middle-frequency range signals. The block length decision block 163 also reduces the block lengths in frames of the digital input signal in which the level of the digital input signal changes compared with frames of the digital input signal in which the level remains relatively constant.

In another possible configuration of the time-frequency analyzer 121 in the audio compressor 112, a time-frequency transform similar to that specified by the MPEG Layer 3 audio coding standard is used. In this, the audio input signal is divided by a set of filters into thirty-two subbands of equal width, followed by an MDCT transform.

In the audio compressor 111 described above, the spectral components in the sets of spectral components may be divided into frequency bands prior to quantizing by the spectral quantizer 123. In this case, the bit allocator 122 will allocate a scale factor and a word length for quantizing the spectral components in each frequency band, the block floating processor 132 will apply block floating processing to the spectral components in each frequency band, and the non-linear quantizer will non-linearly quantize the spectral components in each frequency band in response to the respective word length for the band. When the non-linear quantizer 133 embodies the first non-linear quantizing method according to the invention, the quantizing value calculator 31 therein calculates a quantizing value for each of the number of quantizing levels indicated by the respective word length in each frequency band, and the quantizer 32 therein quantizes the block floating-processed spectral components in each frequency band to the nearest quantizing value determined for the band by the quantizing value calculator 31.

In the audio transmission or recording system 110, the expander 112 will accurately expand the compressed signal reproduced from the recording or transmission medium 113 as long as the non-linear dequantizer in the expander operates using the inverse of the non-linear function used by the non-linear quantizer 133 in the compressor 111. As far as the expander is concerned, it is irrelevant whether the quantized spectral components in the compressed signal were quantized using the non-linear quantizing according to the present invention or according to the prior art, since the quantizing values of the quantizing levels are the same in both cases. However, when the quantized spectral components in the compressed signal have been non-linearly quantized by the non-linear quantizing method according to the invention, the quantizing errors resulting when the expander 112 expands the compressed signal are smaller than when the non-linear quantizing has been performed according to the prior art. This is because non-linear quantizing according to the invention uses different decision values from those used by prior-art non-linear quantizing using the same non-linear function.

The non-linear quantizer embodying the first non-linear quantizing method according to the invention and described above with reference to FIGS. 7 and 8 uses a fixed non-linear function f(), and calculates the quantizing values anew each time the word length or the number of quantizing levels is changed. This may consume considerable computing power. Moreover, the quantizing effects of a given non-linear function f() may vary according to the number of quantizing levels.

Accordingly, a non-linear quantizer embodying a second non-linear quantizing method according to the invention uses a look-up table that defines an input range x with a quantized output value T[x] for each quantizing level. No pre-processing using the non-linear function f() need be performed during the quantizing processing. Instead, the non-linearity of the quantizing is determined by the distribution of the input ranges specified in T[]. These input ranges may be set arbitrarily without changing the complexity of the quantizing process. A separate look-up table T[] must be specified for each possible number of quantizing levels. When the input ranges and quantizing values in each look-up table T[] are based on a single non-linear function f(), the input ranges and quantizing values may be chosen in such a way that a non-linear quantizer embodying the second non-linear quantizing method according to the invention generates smaller quantizing errors than a prior-art non-linear quantizer based on the same non-linear function.

A block diagram of a non-linear quantizer 40 embodying the second non-linear quantizing method according to the invention is shown in FIG. 14. In this second non-linear quantizing method, the data subject to quantizing are non-linearly quantized using a look-up table selected from a set of look-up tables to generate the non-linearly quantized data.

In FIG. 14, in the non-linear quantizer 40, the table quantizer 42 receives the data subject to quantizing via the input terminal 10, quantizes each of the data subject to quantizing using a look-up table received from the table selector 42 to generate respective non-linearly quantized data, and supplies the resulting quantized data to the output terminal 14. The data subject to quantizing received via the input terminal 10 are normally a block or set of data, such as a set of spectral coefficients, that are to be quantized using the same number of quantizing levels or the same word length.

The table selector 41 stores a set of look-up tables for use by the table quantizer 42. The table selector 41 receives via the input terminal 11 an input indicating the number of quantizing levels to be used for quantizing the data subject to quantizing. In response to the input indicating the number of quantizing levels, the table selector 41 selects one of the look-up tables from the set of look-up tables stored therein, and feeds the selected look-up table to the table quantizer 42. The table selector 41 can alternatively receive an input indicating the word length to be used for quantizing the data subject to quantizing in lieu of the input indicating the number of quantizing levels.

The look-up tables in the set of look-up tables stored in the table selector 41 are normally derived from a non-linear function f() indicated diagrammatically in FIG. 14 by the non-linear function block 43. The set of look-up tables stored in the table selector 41 for a given non-linear function consists of a unique look-up table for each possible value of the number of quantizing levels (or word length). Each look-up table consists of a table entry for each quantizing level in the number of quantizing levels indicated by the quantizing level data received via the input terminal 11. Each table entry consists of the input range and the output quantized value for the quantizing level.

The union of the input ranges for all the table entries in each look-up table must encompass the range of data values of the data subject to quantizing, so that a table entry exists for every possible data value in the range of data values. Moreover, there must be no overlap of the input ranges of the table entries in each look-up table, so that no more than one table entry exists for every possible data value in the range of data values. In other words, in each look-up table, there must be one, and only one, table entry that has an input range that corresponds to each possible data value in the range of data values.

An example of the look-up table for five quantizing levels is shown in FIG. 15. To simplify the table, the input data ranges are represented by decimal numbers with a resolution of 0.01 instead of by binary numbers with a resolution of the least-significant bit. In practice, the input ranges would be represented by binary numbers having a number of bits equal to, or greater than, the number of bits in each of the data subject to quantizing. To ensure that the input ranges cover the whole of the range of data values without overlap, the maximum of each data range would differ from the minimum of the next-higher input range by the least-significant bit.

Returning now to FIG. 14, the table selector 41 selects the appropriate look-up table from the set of look-up tables stored therein in response to the input received via the input terminal 11 indicating the number of quantizing levels for quantizing the data subject to quantizing, and feeds the selected look-up table to the table quantizer 42. Then, for each of the data subject to quantizing, table quantizer determines the one of the input ranges in the selected look-up table into which the data value falls, and provides the corresponding output quantized value from the look-up table as the respective one of the non-linearly quantized data.

The non-linear quantizer 40 shown in FIG. 14 provides a great deal of flexibility, since it can perform quantizing using any non-linear function f(), and its complexity does not increase with increasing complexity of the non-linear function f().

In generating the look-up tables stored in the table selector 41, the limits of the input ranges may be determined in any desired manner, for example, by conversion from a non-linear function f(), or by direct calculation.

Figure 1:
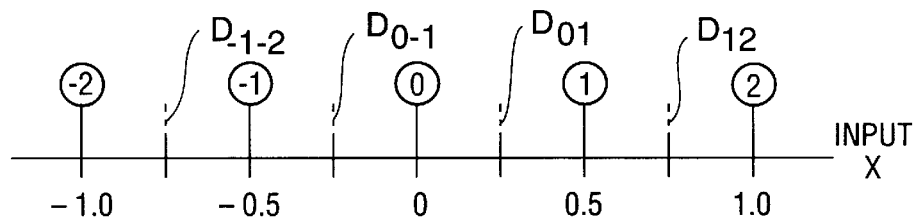
FIG. 1 is an input domain diagram illustrating linear quantizing according to the prior art.
Figure 2:
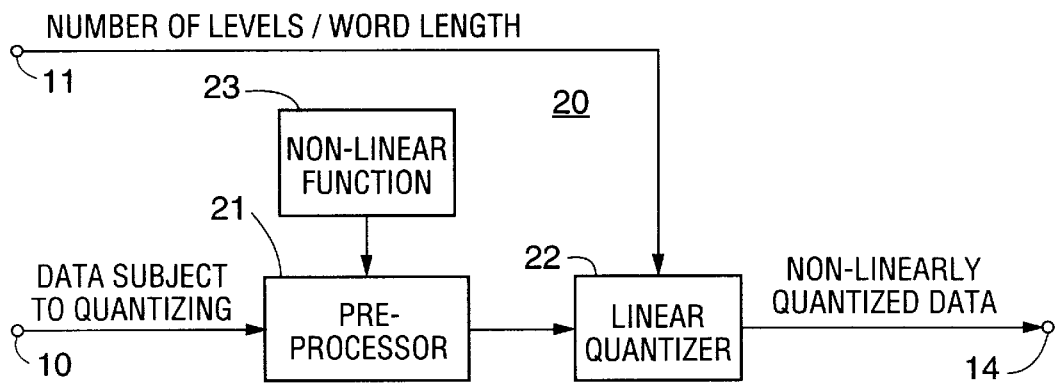
FIG. 2 is a block diagram of a non-linear quantizer according to the prior art in which the data are subject to a non-linear transformation prior to linear quantizing.
Figure 3:
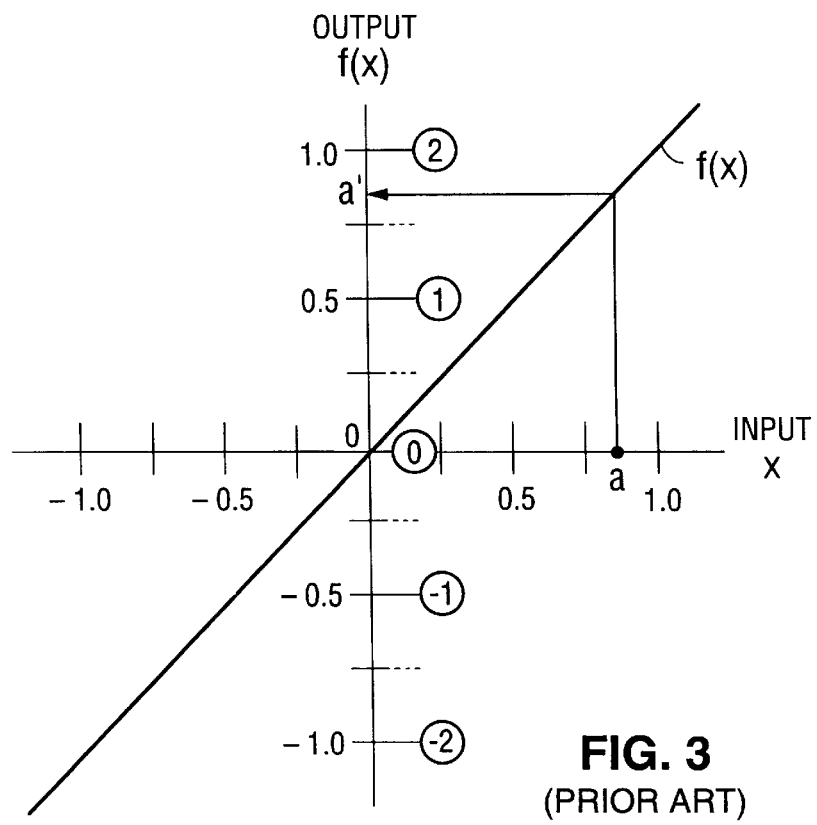
FIG. 3 is an input/output diagram illustrating linear quantizing based on a non-linear quantizing model.
Figure 6:
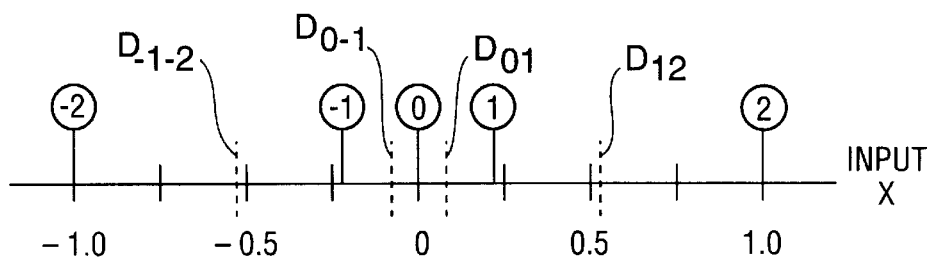
FIG. 6 is an input domain diagram illustrating the quantizing values and decision values generated by the prior-art non-linear quantizing method illustrated in FIG. 5.

When the input ranges are calculated directly, the non-linear quantizer 40 will generate the lower quantizing errors provided by the first non-linear quantizing method according to the invention operating with the same non-linear function. These quantizing errors are lower than the prior-art non-linear quantizer shown in FIG. 2 operating with the same non-linear function. As shown in FIG. 6, the decision values between the quantizing levels of the prior-art non-linear quantizer shown in FIG. 2 are not located at the midpoints between the quantizing values. As a result, some data values are not quantized to the nearest quantizing value. This is an artifact of prior-art non-linear quantizers. The non-linear quantizer 40 embodying the second quantizing method according to the invention, on the other hand, allows the input ranges in the look-up tables to be chosen to make the decision values fall exactly at the midpoints between the quantizing values. When this is done, the quantizing errors generated by the second non-linear quantizing method according to the invention are as shown by the solid lines in FIGS. 10A and 10B for three-level and seven-level quantizing, respectively. The quantizing errors generated by prior-art non-linear quantizing are shown by dotted lines in these figures for comparison.

As mentioned above, the non-linear quantizer 40 embodying the second non-linear quantizing method according to the invention may be substituted for the non-linear quantizer 30 embodying the first non-linear quantizing method according to the invention as the non-linear quantizer 133 in the compressor 111 of the audio signal transmission or recording system shown in FIGS. 11–13. The second non-linear quantizing method according to the invention is not limited to this application, however. The second non-linear quantizing method according to the invention will confer the advantages described above when used in other non-linear quantizing applications.

When a non-linear quantizer embodying the second non-linear quantizing method according to the invention is used as the non-linear quantizer 133, the table selector 41 receives the word length for each set of spectral components from the bit allocator 122 via the input terminal 11, and the table quantizer 42 receives the sets of block floating-processed spectral components from the block floating processor 132 via the input terminal 10. The table quantizer then quantizes the block floating-processed spectral components in each set using the look-up table selected by the table selector 41 in response to the word length for the set received from the bit allocator 122. The table quantizer feeds the resulting set of quantized spectral components to the multiplexer 125 via the output terminal 14.

If the sets of spectral components are divided into frequency bands prior to quantizing, the bit allocator 122 will allocate a scale factor and a word length for quantizing the spectral components in each frequency band, and the block floating processor 132 will apply block floating processing to the spectral components in each frequency band. In this case, the table selector 41 will select a look-up table for each frequency band for feeding to the table quantizer 42, and the table quantizer 42 will quantize the block floating-processed spectral components in each band using the look-up table for the band received from the table selector. Alternatively, the table selector 41 may select a look-up table corresponding to each of the different word lengths with which the set of spectral components is to be quantized, and may feed these look-up tables to the table quantizer 42 together with correlation data indicating which look-up table is to be used for quantizing each the frequency bands. The table quantizer would then quantize the spectral components in each of the frequency bands using the look-up table indicated by the correlation data.

In the embodiment just described, the quantizing value for each quantizing level can be stored in the tables in the table selector 41 in lieu of the input range for each quantizing value. In this case, the table quantizer will quantize each of the data subject to quantizing to the nearest quantizing value.

Figure 16A:
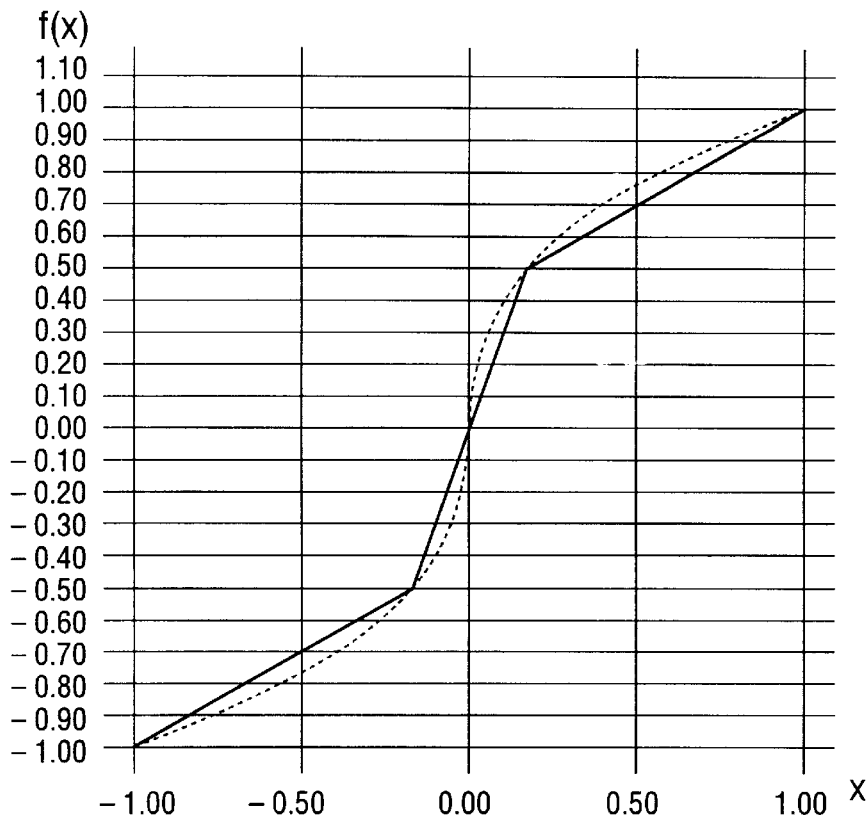
FIG. 16A is a graph showing a piecewise linear approximation of a non-linear function for five quantizing levels for use in the third non-linear quantizing method according to the invention.
Figure 16B:
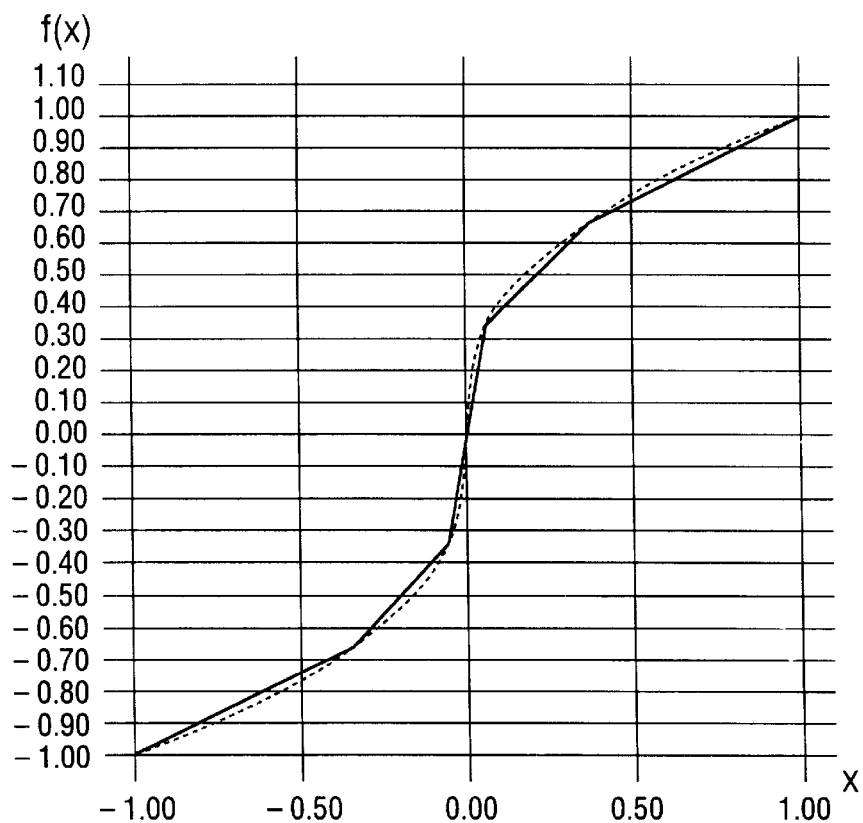
FIG. 16B is a graph showing a piecewise linear approximation of a non-linear function for seven quantizing levels for use in the third non-linear quantizing method according to the invention.

A non-linear quantizer 50 embodying a third non-linear quantizing method according to the invention will now be described with reference to FIGS. 16A, 16B, and 17. The non-linear quantizer 50 is based on the non-linear quantizer 10 shown in FIG. 2, and the data subject to quantizing are pre-processed according to a non-linear function before being quantized using a linear quantizer. In the non-linear quantizer 50, quantizing errors are reduced relative to those produced by the non-linear quantizer 10 shown in FIG. 2 by replacing the non-linear function used to pre-process the data subject to quantizing with a selected piecewise linear approximation of the non-linear function. The piecewise linear approximation selected depends on the number of quantizing levels (or the word length) with which the data subject to quantizing will be quantized following preprocessing. The pre-processed data resulting from preprocessing the data subject to quantizing with the selected piecewise linear approximation are then linearly quantized with the corresponding number of quantizing levels having uniformly-spaced quantizing values to provide the non-linearly quantized data. The third non-linear quantizing method according to the invention provides lower quantizing errors than prior-art non-linear quantizing using the same prototype non-linear function.

To accommodate quantizing using different numbers of quantizing levels (or different word lengths) a set of piecewise linear approximations of the prototype non-linear functions is provided. Each piecewise linear approximation of the non-linear function in the set is a different piecewise linear approximation of the prototype non-linear function corresponding to each number of quantizing levels (or each word length). Each piecewise linear approximation of the non-linear function is equal to the prototype non-linear function at each of the quantizing values, and is linear between successive quantizing values. FIGS. 16A and 16B show an exemplary prototype non-linear function, indicated by the dotted line, and, indicated by the solid line, the corresponding piecewise linear approximation for five quantizing levels and seven quantizing levels, respectively.

Figure 17:
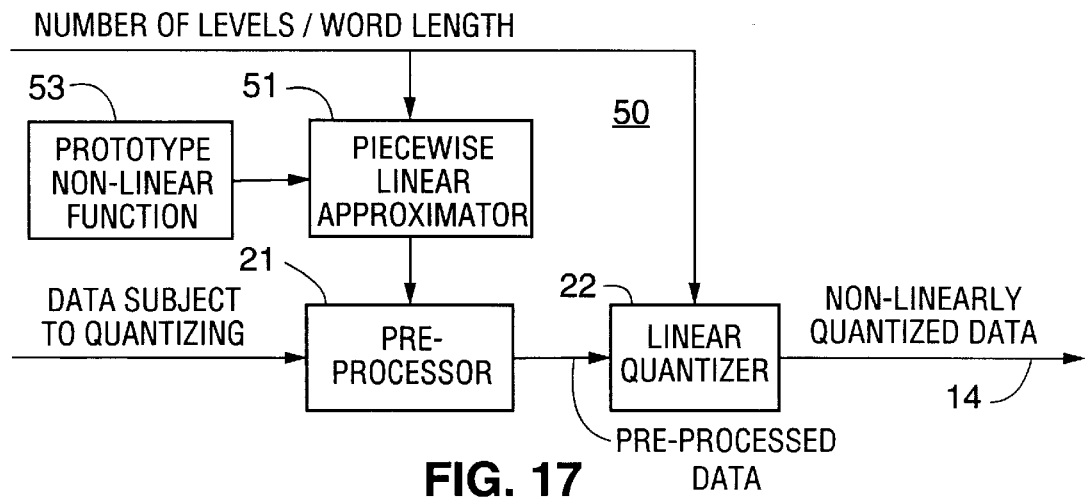
FIG. 17 is a block diagram of a non-linear quantizer embodying the third non-linear quantizing method according to the invention.

FIG. 17 shows a block diagram of the non-linear quantizer 50 embodying the third non-linear quantizing method according to the invention. In the non-linear quantizer 50, the data subject to quantizing are fed via the input terminal 10 to the pre-processor 21. The data subject to quantizing are normally a block or set of data, such as a set of spectral coefficients, that are to be quantized using the same number of quantizing levels or the same word length. The pre-processor 21 pre-processes each of the data subject to quantizing according to the piecewise linear approximation of the non-linear function received from the piecewise linear approximator 51, and feeds the resulting pre-processed data to the linear quantizer 22. The linear quantizer 22 uses uniformly-spaced quantizing values set according to an input received via the input terminal 11 indicating the number of quantizing levels. The linear quantizer 22 quantizes the pre-processed data to the quantizing level corresponding to the nearest uniformly-spaced quantizing value and feeds the resulting non-linearly quantized data to the output terminal 14.

The piecewise linear approximator 51 receives the prototype non-linear function from the non-linear function block 53 and also receives via the input terminal 11 an input indicating the number of quantizing levels to be used for quantizing the data subject to quantizing. In response to the input indicating the number of quantizing levels and the prototype non-linear function, the piecewise linear approximator 51 generates the piecewise linear approximation of the non-linear function corresponding to the number of quantizing levels (or the word length), and feeds this approximation to the pre-processor 21. In lieu of the input indicating the number of quantizing levels, the piecewise linear approximator 51 and the linear quantizer 22 can alternatively receive an input indicating the word length with which the data subject to quantizing will be quantized.

Figure 4:
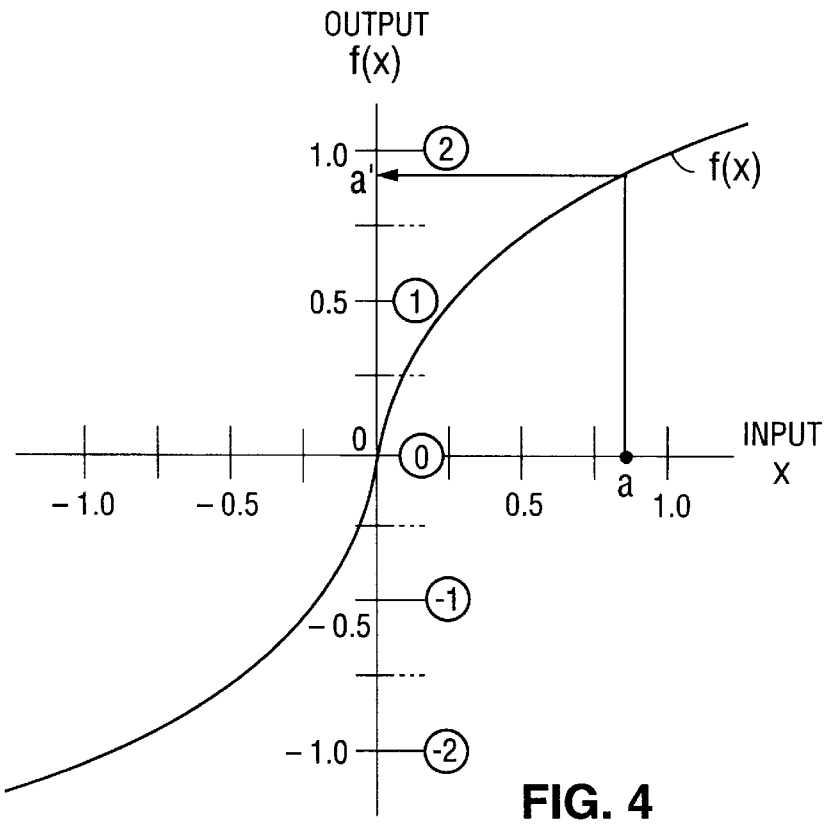
FIG. 4 is an input/output diagram illustrating non-linear quantizing according to the prior art.
Figure 18:
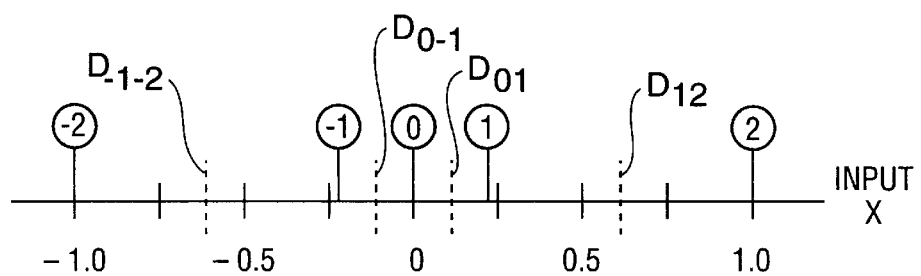
FIG. 18 is an input domain diagram illustrating the quantizing values and decision values generated by the non-linear quantizing methods according to the invention.

The reduction in quantizing errors provided by the third non-linear quantizing method according to the invention compared with prior-art non-linear quantizing using the same prototype function can be seen by comparing quantizing values and the decision values between consecutive quantizing values in the input domain. If the non-linear function shown in FIG. 4 is used as the prototype non-linear function, the quantizing values would be, by definition, identical to those shown in FIGS. 5 and 6. In other words, the decision values indicated by dotted lines in FIG. 6 would not be located at the midpoints between successive quantizing values. However, because the piecewise linear approximations of the non-linear function used by the third non-linear quantizing method according to the invention are linear between consecutive quantizing values, the decision values fall at the midpoints between the consecutive quantizing values, as shown in FIG. 18. This reduces the quantizing errors without changing the non-linearity of the quantized data points.

The quantized data generated by the third non-linear quantizing method according to the invention can be dequantized using a prior-art non-linear dequantizer based on the inverse of the prototype non-linear function. Such dequantizing would result in reduced quantizing errors. For example, if the non-linear function shown by the solid line in FIG. 9 were used as the prototype non-linear function, the quantizing errors would be as shown by the solid line in FIGS. 10A and 10B for three and seven quantizing levels, respectively, when the quantized data resulting from quantizing by the third non-linear quantizing method according to the invention are dequantized using a prior-art dequantizer using the inverse of the prototype non-linear function.

For comparison, the quantizing errors resulting from quantizing the data using prior-art non-linear quantizing are indicated by the dotted lines in FIGS. 10A and 10B. In all cases, the quantizing errors generated by the quantizing method according to the invention are less than or equal to the quantizing errors generated by prior art non-linear quantizing.

As mentioned above, a non-linear quantizer embodying the third non-linear quantizing method according to the invention may be substituted for the non-linear quantizer 30 embodying the first non-linear quantizing method according to the invention as the non-linear quantizer 133 in the compressor 111 of the audio signal transmission or recording system shown in FIGS. 11–13. The third non-linear quantizing method according to the invention is not limited to this application, however. The third non-linear quantizing method according to the invention will confer the advantages described above when used in other non-linear quantizing applications.

When a non-linear quantizer embodying the third non-linear quantizing method according to the invention is used as the non-linear quantizer 133, the piecewise linear approximator 52 and the linear quantizer 22 receive the word length for each set of spectral components from the bit allocator 122 via the input terminal 11, and the pre-processor 21 receives the sets of block floating-processed spectral components from the block floating processor 132 via the input terminal 10. The pre-processor 21 pre-processes the block floating-processed spectral components in each set using the piecewise linear approximation of the non-linear function generated by the piecewise linear approximator 52 in response to the word length for the set received from the bit allocator 122. The linear quantizer 22 linearly quantizes the resulting pre-processed spectral components in the set to generate a set of non-linearly quantized spectral components. The linear quantizer feeds the set of non-linearly quantized spectral components to the multiplexer 125 via the output terminal 14.

If the sets of spectral components are divided in frequency into frequency bands prior to quantizing, as mentioned above, the bit allocator 122 will allocate a scale factor and a word length for quantizing the spectral components in each frequency band, and the block floating processor 132 will apply block floating processing to the spectral components in each frequency band. In this case, the piecewise linear approximator 52 will generate a piecewise linear approximation of the non-linear function for each frequency band for feeding to the pre-processor 21, and the pre-processor 21 will pre-process the block floating-processed spectral components in each frequency band using the piecewise linear approximation for the band received from the piecewise linear approximator.

The non-linear quantizers described above, and non-linear quantizers according to the prior art, use the same non-linear function f() irrespective of the number of quantizing levels (or the word length). This limits the performance of the quantizer, because the quantizing effects of a given function vary according to the number of quantizing levels (or the word length) used to quantize the data. In a non-linear quantizer embodying a fourth non-linear quantizing method according to the invention, the non-linear function f() is chosen from among a set of non-linear functions according to the number of quantizing levels (or the word length) allocated for quantizing the data. The set of non-linear functions may consist of a set of piecewise linear approximations of respective prototype non-linear functions that differ according to the number of quantizing levels allocated for quantizing the data.

Figure 19:
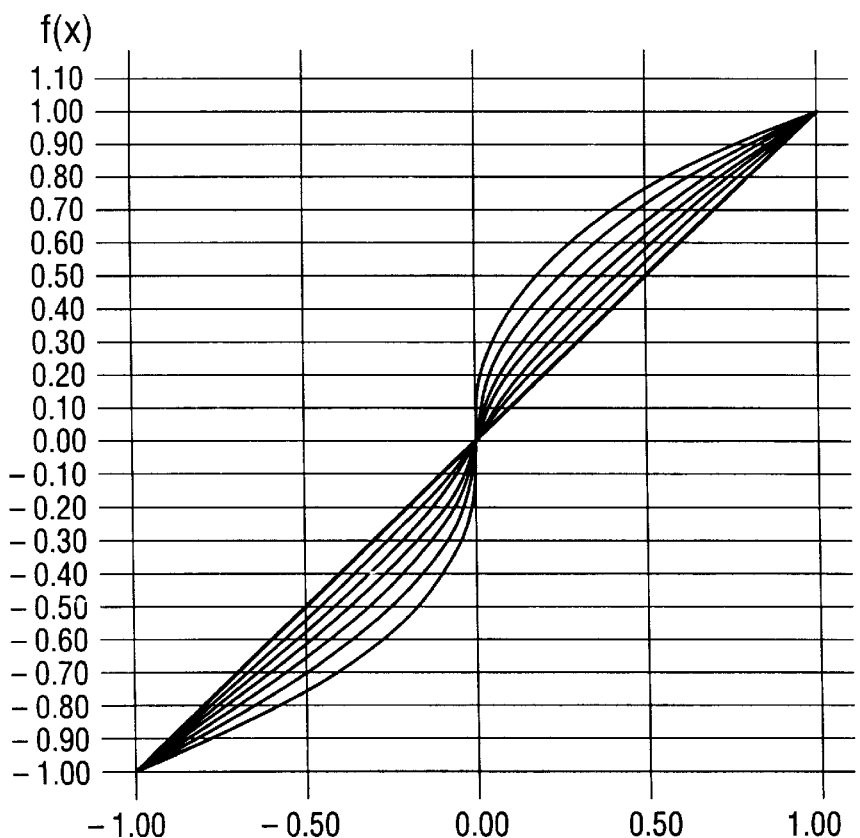
FIG. 19 is a graph showing an exemplary set of non-linear functions for use in the fourth non-linear quantizing method according to the invention.

FIG. 19 shows an exemplary set of non-linear functions for use in the fourth non-linear quantizing method according to the invention. The set contains seven members, and is therefore suitable for a quantizing scheme in which the number of quantizing levels has seven allowable values. Alternatively, this set of non-linear functions can also be used in a non-linear quantizing scheme in which the number of quantizing levels has more than seven allowable values if two or more of the values of the number of quantizing levels use the same non-linear function.

In the set of non-linear functions shown in FIG. 19, the function that is closest to a linear function would preferably be used with the smallest number of quantizing levels, i.e., with the shortest quantizing word length. Progressively larger values of the number of quantizing levels or longer quantizing word lengths would select non-linear functions that are progressively more non-linear. This permits highly non-linear quantizing to be performed using large quantizing word lengths, while preventing the gross distortion that would result if a highly non-linear function were used with small quantizing word lengths.

For example, a non-linear function such as $y=x^{0.55}$ could be used with a word length of about 2 or 3 bits, and a non-linear function such as $y=x^{0.4}$ could be used with a word length of 4 bits.

Figure 20:
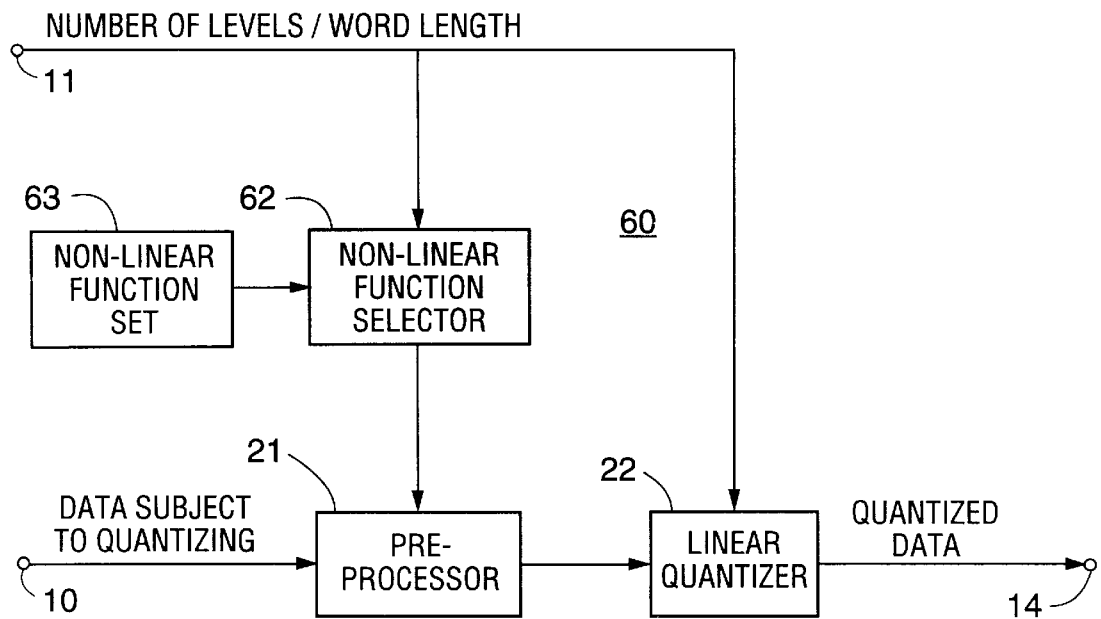
FIG. 20 is a block diagram of a non-linear quantizer embodying the fourth non-linear quantizing method according to the invention.

FIG. 20 shows a block diagram of a non-linear quantizer 60 embodying the fourth non-linear quantizing method according to the invention. In the quantizer 60, the data subject to quantizing are pre-processed by the pre-processor 21 according to a non-linear function received from the non-linear function selector 62. The resulting pre-processed data are then fed from the pre-processor 21 to the linear quantizer 22, which linearly quantizes them to generate the non-linearly quantized data which it feeds to the output terminal 14.

The non-linear function block 63 stores a set of different non-linear functions. The non-linear function block may alternatively store a piecewise linear approximation of each non-linear function in lieu of the non-linear function itself. Using the piecewise linear approximation of the non-linear function in lieu of the non-linear function itself reduces quantizing errors by changing the decision values so that they occur at the midpoint between adjacent quantizing values. For simplicity, unless otherwise stated, references below to "non-linear function" will be taken to mean a non-linear function and a piecewise linear approximation of the non-linear function.

The non-linear function selector 62 uses a predetermined non-linear function selection method to select, from the set of non-linear functions stored in the non-linear function block 63, one of the non-linear functions to be used for non-linearly quantizing the data subject to quantizing. The non-linear function selector 62 feeds selects the selected non-linear function to the pre-processor 21. The pre-processor 21 receives the data subject to quantizing via the input terminal 10 and pre-processes each of the data subject to quantizing according to the selected non-linear function, and feeds the resulting pre-processed data to the linear quantizer 22. The linear quantizer 22 linearly quantizes the pre-processed data to provide the non-linearly quantized data, which it feeds to the output terminal 14.

In the most general implementation of the fourth embodiment of the non-linear quantizer 60, the set of non-linear functions stored in the non-linear function block 61 contains a non-linear function for each allowable number of quantizing levels (or each allowable word length). An input is received via the input terminal 11 indicating the number of quantizing levels to be used for quantizing the data subject to quantizing, and is fed to the linear quantizer 22 and additionally to the non-linear function selector 62. In response to the input indicating the number of quantizing levels (or the word length) to be used for quantizing the data subject to quantizing, the non-linear function selector 62 selects one of the non-linear functions stored in the non-linear function block 63 for feeding to the pre-processor 21.

In another implementation, the non-linear function selector 62 may be configured such that two or more possible values of the number of quantizing levels select the same non-linear function. However, if a piecewise linear approximation of the non-linear function is used in lieu of the non-linear function itself, a different piecewise approximation must be used for each value of the number of quantizing levels, even though two of more possible values of the number of quantizing levels select the same prototype non-linear function.

As mentioned above, a non-linear quantizer embodying the fourth non-linear quantizing method according to the invention may be substituted for the non-linear quantizer embodying the first non-linear quantizing method according to the invention as the non-linear quantizer 133 in the compressor 111 of the audio signal transmission or recording system shown in FIGS. 11–13. The fourth non-linear quantizing method according to the invention is not limited to this application, however. The fourth non-linear quantizing method according to the invention will confer the advantages described above when used in other non-linear quantizing applications.

When the non-linear quantizer embodying the fourth non-linear quantizing method according to the invention is used as the non-linear quantizer 133, the non-linear function selector 62 receives the word length for each set of spectral components from the bit allocator 122 via the input terminal 11, and the pre-processor 21 receives the sets of block floating-processed spectral components from the block floating processor 132 via the input terminal 10. The pre-processor 21 pre-processes the block floating-processed spectral components in each set using the non-linear function selected by the non-linear function selector 62 in response to the word length for the set received from the bit allocator 122. The linear quantizer 22 linearly quantizes the resulting pre-processed spectral components in the set to generate a set of non-linearly quantized spectral components, which it feeds to the multiplexer 125 via the output terminal 14.

If the sets of spectral components are divided in frequency into frequency bands prior to quantizing, as mentioned above, the bit allocator 122 will allocate a scale factor and a word length for quantizing the spectral components in each frequency band, and the block floating processor 132 will apply block floating processing to the spectral components in each frequency band. In this case, the non-linear function selector 62 will select for each frequency band a non-linear function from the set of non-linear functions stored in the non-linear function set 61. The non-linear function selector will feed the non-linear function selected for each frequency band to the pre-processor 21, and the pre-processor 21 will pre-process the block floating-processed spectral components in each frequency band using the non-linear function for the frequency band received from the non-linear function selector.

The first and second non-linear quantizing methods according to the invention can also employ different non-linear functions depending on the word length or the number of quantizing levels. In the non-linear quantizer embodying the first non-linear quantizing method according to the invention and shown in FIG. 7, the input received via the input terminal 11 can also be fed to the non-linear function block 33, as indicated by the broken line 34, and the non-linear function block 33 can supply to the quantizing value calculator 31 a non-linear function that depends on the number of quantizing levels or the word length.

In the non-linear quantizer embodying the second non-linear quantizing method according to the invention and shown in FIG. 14, the data entries in the tables in the set of tables stored in the table selector 41 can be calculated using different non-linear functions depending on the number of quantizing levels. Selecting the look-up table in response to the input indicating the number of quantizing levels (or the word length) received via the input terminal 11 would then automatically select a non-linear function that differs according to the number of quantizing levels.

The use of different non-linear functions in the third non-linear quantizing method according to the invention is described above with reference to FIG. 20.

Figure 21:
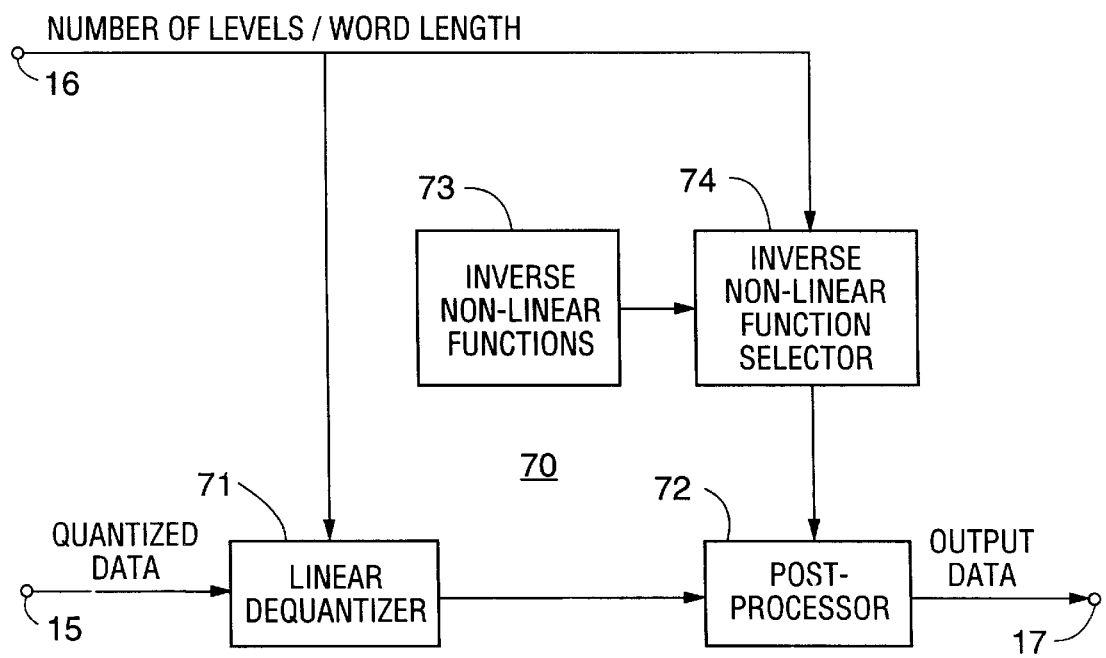
FIG. 21 is a block diagram of a non-linear dequantizer embodying the non-linear dequantizing method according to the invention.

When the quantized data are quantized using a non-linear function selected according to the number of quantizing levels with which the data subject to quantizing are quantized, the quantized data cannot be dequantized using a prior art dequantizer. This is because the prior art dequantizer is based on only a single non-linear function. FIG. 21 is a block diagram of a non-linear dequantizer 70 embodying the non-linear dequantizing method according to the invention. In the non-linear quantizer 70, the linear dequantizer 71 receives the non-linearly quantized data via the input terminal 15, and a respective input indicating the number of quantizing levels (or the word length) with which the non-linearly quantized data are quantized via the input terminal 16. The input indicating the number of quantizing levels is also fed to the inverse non-linear function selector 74. The linear dequantizer 71 dequantizes the non-linearly quantized data in accordance with the input indicating the number of quantizing levels, and feeds the resulting non-linear data to the post-processor 72, which applies post processing according to a selected inverse non-linear function and feeds the resulting dequantized data to the output terminal 17.

Since it must dequantize quantized data that have been quantized using different non-linear functions selected according to the number of quantizing levels, the dequantizer 70 includes the inverse non-linear function block 73, in which are stored a set of plural inverse non-linear functions. Each inverse non-linear function in the set corresponds to one of the non-linear functions originally used in the compressor 111 (FIG. 11) to quantize the data subject to quantizing. For example, each of the inverse non-linear functions in the set may correspond to one of the non-linear functions stored in the non-linear function block 63 in the quantizer 60 (FIG. 20).

The inverse non-linear quantizer 70 also includes the inverse non-linear function selector 74, which selects one of the set of inverse non-linear functions stored in the inverse non-linear function block 73 using the same selection method as that which was used to select the non-linear function in the quantizer. The selected inverse non-linear function is fed to the post-processor 72, which applies post processing to the non-linear data from the linear dequantizer 71 using the selected inverse non-linear function. Thus, in the example shown, the post processor 72 applies post processing to the non-linear data using the inverse of the non-linear function that was used in the quantizer 60 to pre-process the data subject to quantizing. The post-processor 72 feeds the resulting dequantized data to the output terminal 17.

In the most general implementation of the non-linear dequantizer 70, the set of inverse non-linear functions stored in the inverse non-linear function block 73 contains an inverse non-linear function for each allowable value of the number of quantizing levels (or word length). The input fed via the input terminal 11 to the linear dequantizer 71 indicating the number of quantizing levels (or the word length) used for quantizing the non-linearly quantized data is additionally fed to the inverse non-linear function selector 74. In response to the input indicating the number of quantizing levels used for quantizing the non-linearly quantized data, the inverse non-linear function selector selects one of the inverse non-linear functions stored in the inverse non-linear function block 73 for feeding to the post-processing block 72.

In embodiments in which there are fewer inverse non-linear functions in the set of inverse non-linear functions than the number of allowable values of the number of quantizing levels (or word length), the inverse non-linear function selector 74 still requires that an input from the terminal 11 indicating the number of quantizing levels (or the word length).

Figure 22:
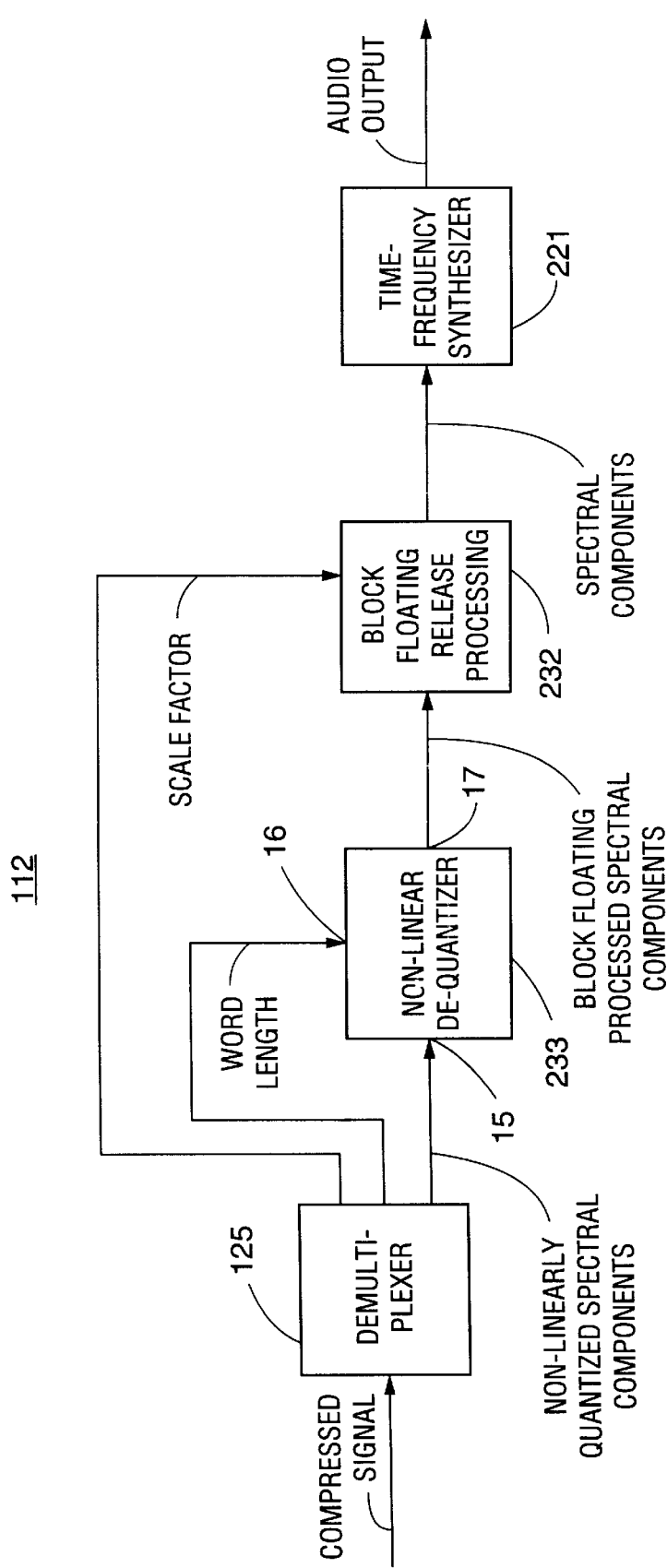
FIG. 22 is a block diagram of the audio expander of the audio signal transmission or recording system shown in FIG. 11. The expander includes a non-linear dequantizer embodying the non-linear dequantizing method according to the invention.

FIG. 22 shows a block diagram of an example of the application of a dequantizer embodying the dequantizing method according to the invention in the audio expander 112 of the audio transmission or recording system 110 shown in FIG. 11. The non-linear dequantizing method according to the invention is not limited to this application, however. The method will confer the advantages described above when used in other non-linear dequantizing applications.

In the expander 112, the compressed signal from the transmission or recording medium is received by the demultiplexer 225. The demultiplexer 225 extracts the sets of quantized spectral components and the respective bit allocation parameters from the compressed signal, and also extracts the word length and the scale factor for each set of quantized spectral components from the bit allocation parameters. The demultiplexer feeds the sets of spectral components to the input terminal 15 of the non-linear dequantizer 233, and feeds the respective word lengths to the input terminal 16 of the non-linear quantizer 233. The demultiplexer also feeds the scale factors to the block floating release processor 232.

The non-linear dequantizer 233 non-linearly dequantizes each set of non-linearly quantized spectral components from the multiplexer 225 using the respective word length to control the linear dequantizing of the quantized spectral components by the linear dequantizer 71 (FIG. 21) and to select the inverse non-linear function used by the post processor 72 to apply post processing to the non-linear spectral components resulting from the linear dequantizing by the linear dequantizer 71.

The sets of block floating processed spectral components generated by the non-linear quantizer 233 are fed to the block floating release processor 232, which reverses the block floating processing applied to each set of spectral components in the compressor. The block floating release processor multiplies the block floating-processed spectral components in each set by the scale factor for the set received from the demultiplexer 225 to produce a set of reconstructed spectral components.

The block floating release processor 232 feeds the set of reconstructed spectral components to the time-frequency synthesizer 221. The time-frequency synthesizer 221 transforms each set of reconstructed spectral components back into the time domain to reconstruct a block of the audio output signal.

If the sets of spectral components are divided in frequency into frequency bands prior to quantizing in the compressor 111, the demultiplexer 225 will extract each band of quantized spectral components and its respective scale factor and word length from the compressed signal. The non-linear dequantizer 233 will non-linearly dequantize the quantized spectral components in each frequency band using the word length for the band, and the block floating release 232 will release the block floating applied to each resulting block floating-processed spectral components to generate a band of reconstructed spectral components. The time-frequency synthesizer 221 then orthogonally transforms the reconstructed spectral components in all the frequency bands back to the time domain, and synthesizes the resulting blocks of the frequency range signals to reconstruct one block of the audio output signal.

Although illustrative embodiments of the invention are described herein in detail, the invention is not limited to the precise embodiments described, and various modifications may be practiced within the scope of the invention defined by the appended claims.

I claim:

1. A method of non-linearly quantizing data representing an information signal to generate therefrom respective quantized data representing the information signal using fewer bits, each of the data, when non-linearly quantized, being represented by a quantizing level selected from a number of quantizing levels, the method non-linearly quantizing the data according to a non-linear function, and comprising steps of:

receiving the data, each of the data having a data value;

receiving word-length information indicating the number of quantizing levels;

determining, from the word-length information and the non-linear function, a quantizing value for each quantizing level in the number of quantizing levels, the quantizing values determined for all the quantizing levels in the number of quantizing levels being non-uniformly spaced;

calculating a decision value between each quantizing level in the number of quantizing levels and a respective adjacent quantizing level, the decision value being calculated from the quantizing value of the quantizing level and the quantizing value of the adjacent quantizing level, wherein the decision values do not lie halfway between adjacent quantizing levels, determining an input range for each quantizing level in the number of quantizing levels, the input range for the quantizing level being determined from adjacent decision values encompassing the quantizing value of each quantizing level; and selecting the quantizing level having the quantizing value closest in value to the data value of each one of the data as a respective one of the quantized data and wherein the quantizing level having the input range encompassing the data value of each one of the data is selected as the respective one of the quantized data.

2. The method of claim 1, wherein:

the non-linear function has an output range; and the determining step includes steps of:

deriving an inverse non-linear function from the non-linear function, the inverse non-linear function being inverse to the non-linear function, distributing the number of quantizing levels uniformly across the output range of the non-linear function to generate a corresponding number of uniformly-spaced values, and processing each of the uniformly-spaced values using the inverse non-linear function to generate a respective one of the quantizing values.

3. The method of claim 1, wherein the method additionally comprises a step of performing time-frequency analysis on the information signal to generate the data.

4. The method of claim 3, wherein:

the information signal comprises a stream of plural samples;

in the step of performing time-frequency analysis, the time-frequency analysis is performed on a block of the samples of the information signal to generate the data; and the method additionally includes a step of deriving, from the block the samples of the information signal, the word-length information received in the step of receiving word-length information.

5. The method of claim 4, wherein:

the step of performing time-frequency analysis includes steps of:
deriving a set of spectral components from the block of the samples of the information signal,
deriving a scale factor from the set of spectral components, and
applying block floating to the set of spectral components using the scale factor to generate the data; and
the step of deriving the word-length information includes a step of deriving the word-length information from the set of spectral components.

6. The method of claim 3, wherein:

the information signal comprises a stream of plural samples;

the step of performing time-frequency analysis includes a step of orthogonally transforming a block of the samples of the information signal to generate the data.

7. The method of claim 6, wherein:

the step of orthogonally transforming a block of the samples to generate the data includes steps of:
orthogonally transforming a block of the samples to generate spectral components divided into frequency bands,
deriving a scale factor for the spectral components in one of the frequency bands,
applying block floating to the spectral components in the one of the frequency bands in response to the scale factor, and providing the resulting block floating-processed spectral components as the data; and
the method additionally includes a step of deriving, from the spectral components in the one of the frequency bands, the word-length information received in the step of receiving word-length information.

8. The method of claim 3, wherein the step of performing time-frequency analysis includes a step of filtering the information signal to generate a sequence of time-domain spectral components in one of plural subbands as the data.

9. The method of claim 8, wherein:

the step of filtering includes steps of:
deriving a scale factor for the sequence of time-domain spectral components in the one of plural subbands,
applying block floating to the sequence of time-domain spectral components in the one of plural subbands in response to the scale factor, and providing the resulting block floating-processed spectral components as the data; and the method additionally includes a step of deriving, from the sequence of time-domain spectral components in the one of the frequency bands, the word-length information received in the step of receiving word-length information.

10. The method of claim 1, wherein:

the method additionally comprising a step of applying block floating to the data to generate block floating-processed data, each of the block floating-processed data having a block-floating-processed data value; and in the step of selecting, the quantizing level having the quantizing value closest in value to the block floating-processed data value of each one of the block floating-processed data is selected as a respective one of the quantized data.

11. The method of claim 1, wherein:

the method additionally comprises a step of storing each quantizing level and the input range thereof in a quantizing table; and the step of selecting the quantizing level includes steps of:
comparing the data value with the input ranges stored in the quantizing table to identify the input range encompassing the data value of the one of the data, and
reading from the quantizing table, as the respective one of the quantized data, the quantizing level of the input range encompassing the data value of the one of the data.

12. The method of claim 11, wherein:

the method additionally comprises steps of:
providing an allowable range for the number of quantizing levels,
constructing a quantizing table for each number of quantizing levels in the allowable range of the number of quantizing levels, each quantizing table being constructed by repetitively performing, for each quantizing level in the number of quantizing levels, the steps of:
determining the quantizing value for the quantizing level;
calculating the decision value between the quantizing level and the respective adjacent quantizing level;
determining the input range for the quantizing level; and
storing the quantizing level and the input range thereof in the quantizing table, and
choosing, from the quantizing tables constructed by the constructing step, the quantizing table for the number of quantizing levels indicated by the word-length information; and
the steps of comparing the data value and reading from the quantizing table are performed using the quantizing table chosen in the choosing step.

13. The method of claim 12, wherein the data are non-linearly quantized using one of plural non-linear functions, and wherein:

the method additionally comprises steps of:
providing plural non-linear functions, each of the non-linear functions corresponding to a different number of the quantizing levels;
designating one of the plural non-linear functions in response to the word-length information; and
in the step of determining the quantizing value for each quantizing level in the number of quantizing levels, the quantizing value is determined from the non-linear function designated in the designating step, and the word length information.

14. The method of claim 1, wherein:

the method additionally comprises a step of storing each quantizing level and the quantizing value thereof in a quantizing table; and the step of selecting the quantizing level includes steps of:
  comparing the data value with the input ranges stored in the quantizing table to identify the input range encompassing the data value of the one of the data, and
  reading from the quantizing table, as the respective one of the quantized data, the quantizing level of the input range encompassing the data value of the one of the data.

15. The method of claim 14, wherein:

the method additionally comprises steps of:
  providing an allowable range for the number of quantizing levels,
  constructing a quantizing table for each number of quantizing levels in the allowable range of the number of quantizing levels, each quantizing table being constructed by repetitively performing, for each quantizing level, the steps of:
    determining the quantizing value; and
    storing the quantizing level and the quantizing value thereof in the quantizing table, and
  choosing, from the quantizing tables constructed by the constructing step, the quantizing table for the number of quantizing levels indicated by the word-length information; and
the steps of comparing the data value and reading from the quantizing table are performed using the quantizing table chosen in the choosing step.

16. The method of claim 15, wherein the data are non-linearly quantized using one of plural non-linear functions, and wherein:

the method additionally comprises steps of:
  providing plural non-linear functions, each of the non-linear functions corresponding to a different number of the quantizing levels;
  designating one of the plural non-linear functions in response to the word-length information; and
  in the step of determining the quantizing value for each quantizing level in the number of quantizing levels, the quantizing value is determined from the non-linear function designated in the designating step, and the word length information.

17. The method of claim 1, wherein the data are non-linearly quantized using one of plural non-linear functions, and wherein:

the method additionally comprises steps of:
  providing plural non-linear functions, each of the non-linear functions corresponding to a different number of the quantizing levels;
  designating one of the plural non-linear functions in response to the word-length information; and
  in the step of determining the quantizing value for each quantizing level in the number of quantizing levels, the quantizing value is determined from the non-linear function designated in the designating step, and the word length information.

18. The method of claim 17, wherein:

the non-linear function designated in the designating step has an output range; and
the determining step includes steps of:
  deriving an inverse non-linear function from the non-linear function, the inverse non-linear function being inverse to the non-linear function,
  distributing the number of quantizing levels uniformly throughout the output range of the non-linear function to generate a corresponding number of uniformly-spaced values, and
  processing each of the uniformly-spaced values using the inverse non-linear function to generate a respective one of the quantizing values.

19. A method of quantizing data representing an information signal to generate therefrom respective quantized data representing the information signal using fewer bits, each of the data, when quantized, being represented by a quantizing level selected from a number of quantizing levels, the method comprising steps of:

receiving the data, each of the data having a data value;

receiving word-length information indicating the number of quantizing levels;

providing a set of quantizing tables, the set of quantizing tables including a quantizing table for each possible number of quantizing levels, each quantizing table including a table entry for each quantizing level in the respective number of quantizing levels, wherein each of the table entries define a decision level determined according to a non-linear function, and wherein the decision levels lie off-center between adjacent quantizing levels;

choosing, from the set of quantizing tables, the quantizing table for the number of quantizing levels indicated by the word-length information; and selecting, from the quantizing table chosen in the choosing step, the quantizing level the table entry whereof corresponds to the data value of each one of the data as a respective one of the quantized data.

20. The method of claim 19, wherein, in the step of providing a set of quantizing tables, the table entries in the quantizing tables provide a non-linear quantizing characteristic.

21. The method of claim 20, wherein, in the step of providing a set of quantizing tables, the table entries in the quantizing tables are derived from a single non-linear function which determines the non-linear quantizing characteristic.

22. The method of claim 19, wherein, in the step of providing a set of quantizing tables, the table entries in the quantizing tables provide a different non-linear quantizing characteristic in different ones of the quantizing tables.

23. The method of claim 22, wherein, in the step of providing a set of quantizing tables, the table entries in the quantizing tables for more quantizing levels provide a more non-linear quantizing characteristic than the table entries in the quantizing tables for fewer quantizing levels.

24. The method of claim 19, wherein:

in the step of providing a set of quantizing tables:
  each quantizing level has a respective quantizing value, and
  each table entry in the quantizing tables includes an input range for the respective quantizing level, the input range encompassing values between adjacent decision levels; and
the selecting step selects the quantizing level of the table entry wherein the input range encompasses the data value of the one of the data.

25. The method of claim 24, wherein, in the step of providing a set of quantizing tables, the input ranges in the table entries in the quantizing tables are set to provide a non-linear quantizing characteristic.

26. The method of claim 19, wherein:
   in the step of providing a set of quantizing tables:
      each quantizing level has a respective quantizing value, and
      each table entry in the quantizing tables includes the quantizing value for the respective quantizing level; and
   the selecting step selects the quantizing level in the table entry wherein the quantizing value is closest in value to the data value of the one of the data.

27. The method of claim 26, wherein, in the step of providing a set of quantizing tables, the quantizing values in the table entries in the quantizing tables are set to provide a non-linear quantizing characteristic.

28. The method of claim 19, wherein the method additionally comprises a step of performing time-frequency analysis on the information signal to generate the data.

29. The method of claim 28, wherein:
   the information signal comprises a stream of plural samples;
   in the step of performing time-frequency analysis, the time-frequency analysis is performed on a block of the samples of the information signal to generate the data; and
   the method additionally includes a step of deriving, from the block the samples of the information signal, the word-length information received in the step of receiving word-length information.

30. The method of claim 29, wherein:
   the step of performing time-frequency analysis includes steps of:
      deriving a set of spectral components from the block of the samples of the information signal,
      deriving a scale factor from the set of spectral components, and
      applying block floating to the set of spectral components using the scale factor to generate the data; and
   the step of deriving the word-length information includes a step of deriving the word-length information from the set of spectral components.

31. The method of claim 28, wherein:
   the information signal comprises a stream of plural samples;
   the step of performing time-frequency analysis includes a step of orthogonally transforming a block of the samples of the information signal to generate the data.

32. The method of claim 31, wherein:
   the step of orthogonally transforming a block of the samples to generate the data includes steps of:
      orthogonally transforming a block of the samples to generate spectral components divided into frequency bands,
      deriving a scale factor for the spectral components in one of the frequency bands,
      applying block floating to the spectral components in the one of the frequency bands in response to the scale factor, and providing the resulting block floating-processed spectral components as the data; and
   the method additionally includes a step of deriving, from the spectral components in the one of the frequency bands, the word-length information received in the step of receiving word-length information.

33. The method of claim 28, wherein the step of performing time-frequency analysis includes a step of filtering the information signal to generate a sequence of time-domain spectral components in one of plural subbands as the data.

34. The method of claim 33, wherein:
   the step of filtering includes steps of:
      deriving a scale factor for the sequence of time-domain spectral components in the one of plural subbands,
      applying block floating to the sequence of time-domain spectral components in the one of plural subbands in response to the scale factor, and providing the resulting block floating-processed spectral components as the data; and
   the method additionally includes a step of deriving, from the sequence of time-domain spectral components in the one of the frequency bands, the word-length information received in the step of receiving word-length information.

35. The method of claim 19, wherein:
   the method additionally comprises a step of applying block floating to the data to generate block floating-processed data, each of the block floating-processed data having a block-floating-processed data value; and
   in the step of selecting, the quantizing level the table entry whereof corresponds to the block floating-processed data value of each one of the block floating-processed data is selected as a respective one of the quantized data.

36. A method of non-linearly quantizing data representing an information signal to generate therefrom respective quantized data representing the information signal using fewer bits, each of the data, when non-linearly quantized, being represented by a quantizing level selected from a number of quantizing levels, the method comprising steps of:
   providing a set of non-linear functions, the non-linear functions each defining a non-linear quantizing characteristic;
   receiving the data, each of the data having a data value;
   receiving word-length information indicating the number of quantizing levels;
   choosing one of the non-linear functions from the set of non-linear functions in response to the word-length information;
   pre-processing the data to generate pre-processed data by applying the non-linear function chosen in the choosing step to each of the data to generate a respective one of the pre-processed data;
   selecting an allowable range, bounded by decision values, for the number of quantizing levels, wherein the decision values are selected according to the chosen non-linear function and wherein the decision values lie off-center between adjacent quantizing levels; and
   linearly quantizing the pre-processed data in response to the word-length information to generate the quantized data.

37. The method of claim 36, wherein
   in the step of providing a set of non-linear functions, a different non-linear function is provided for each number of quantizing levels in the allowable range for the number of quantizing levels.

38. The method of claim 36, wherein:
   in the step of providing a set of non-linear functions, the non-linear functions vary in non-linearity; and
   in the choosing step, the one of the non-linear functions chosen has a greater non-linearity when the word-length information indicates more quantizing levels than the one of the non-linear functions chosen when the word-length information indicates fewer quantizing levels.

39. The method of claim 36, wherein
in the step of providing a non-linear function set, there is provided, as each of the non-linear functions in the non-linear function set, a piecewise linear approximation of a non-linear function, one piecewise approximation of a non-linear function being provided for each number of quantizing levels in the allowable range for the number of quantizing levels, each piecewise linear approximation including:
plural nodes whereat the piecewise non-linear approximation coincides with the non-linear function, the nodes being equal in number to the respective number of quantizing levels, and
linear segments interconnecting consecutive ones of the nodes.

40. The method of claim 39, wherein in the step of providing a set of non-linear functions, the non-linear functions approximated by the piecewise linear approximations vary in non-linearity, the non-linear functions approximated by the piecewise linear approximations for larger numbers of quantizing levels being more non-linear than the non-linear functions approximated by the piecewise linear approximations for smaller numbers of quantizing levels.

41. The method of claim 39, wherein, in the step of providing a set of non-linear functions, the piecewise linear approximations all approximate the same non-linear function.

42. The method of claim 36, wherein the method additionally comprises a step of performing time-frequency analysis on the information signal to generate the data.

43. The method of claim 42, wherein:
the information signal comprises a stream of plural samples;
in the step of performing time-frequency analysis, the time-frequency analysis is performed on a block of the samples of the information signal to generate the data; and
the method additionally includes a step of deriving, from the block the samples of the information signal, the word-length information received in the step of receiving word-length information.

44. The method of claim 43, wherein:
the step of performing time-frequency analysis includes steps of:
deriving a set of spectral components from the block of the samples of the information signal,
deriving a scale factor from the set of spectral components, and
applying block floating to the set of spectral components using the scale factor to generate the data; and
the step of deriving the word-length information includes a step of deriving the word-length information from the set of spectral components.

45. The method of claim 42, wherein:
the information signal comprises a stream of plural samples;
the step of performing time-frequency analysis includes a step of orthogonally transforming a block of the samples of the information signal to generate the data.

46. The method of claim 45, wherein:
the step of orthogonally transforming a block of the samples to generate the data includes steps of:
orthogonally transforming a block of the samples to generate spectral components divided into frequency bands,
deriving a scale factor for the spectral components in one of the frequency bands,
applying block floating to the spectral components in the one of the frequency bands in response to the scale factor, and providing the resulting block floating-processed spectral components as the data; and
the method additionally includes a step of deriving, from the spectral components in the one of the frequency bands, the word-length information received in the step of receiving word-length information.

47. The method of claim 42, wherein the step of performing time-frequency analysis includes a step of filtering the information signal to generate a sequence of time-domain spectral components in one of plural subbands as the data.

48. The method of claim 47, wherein:
the step of filtering includes steps of:
deriving a scale factor for the sequence of time-domain spectral components in the one of plural subbands,
applying block floating to the sequence of time-domain spectral components in the one of plural subbands in response to the scale factor, and providing the resulting block floating-processed spectral components as the data; and
the method additionally includes a step of deriving, from the sequence of time-domain spectral components in the one of the frequency bands, the word-length information received in the step of receiving word-length information.

49. The method of claim 36, wherein:
the method additionally comprises a step of applying block floating to the data to generate block floating-processed data; and
in the pre-processing step, the pre-processed data are generated by applying the non-linear function chosen in the choosing step to each of the block-floating processed data.

50. A method of non-linearly quantizing input data representing an information signal to generate therefrom respective quantized data representing the information signal using fewer bits, each of the data, when non-linearly quantized, being represented by an output quantizing level selected from a number of output quantizing levels, the method non-linearly quantizing the data according to a non-linear function, and comprising the steps of:
receiving the input data, each of the input data having a data value;
receiving word-length information indicating the number of quantizing levels;
determining, from the word-length information and the non-linear function, an input quantizing value for each quantizing level in the number of quantizing levels;
determining, from the quantizing values, input decision levels wherein each of the input decision levels lie halfway between adjacent quantizing values, and further wherein each of the input decision levels correspond, via the non-linear function, to an output decision level wherein the output decision levels do not lie halfway between adjacent output levels;
determining, from adjacent input decision levels, an input decision rage for each quantizing level; and selecting the quantizing level having the input decision rage encompassing the data value of each one of the input data as a respective one of the quantized data.

51. The method of claim 50, wherein:

the non-linear function has an output range; and the determining an input quantizing value step includes steps of:

deriving an inverse non-linear function from the non-linear function, the inverse non-linear function being inverse to the non-linear function, distributing the number of quantizing levels uniformly across the output range of the non-linear function to generate a corresponding number of uniformly-spaced values, and processing each of the uniformly-spaced values using the inverse non-linear function to generate a respective one of the quantizing values.

52. The method of claim 50, wherein the method additionally comprises a step of performing time-frequency analysis on the information signal to generate the data.

\* \* \* \* \*